(12) United States Patent
Ueno et al.

(10) Patent No.: US 7,095,593 B2
(45) Date of Patent: Aug. 22, 2006

(54) APPARATUS WITH HEAD AND HEAD SUPPORT DEVICE HAVING ROTATION SUPPORTING POINT

(75) Inventors: Yoshihiro Ueno, Osaka (JP); Hideki Kuwajima, Kyoto (JP); Zhisheng Deng, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 344 days.

(21) Appl. No.: 10/670,366

(22) Filed: Sep. 26, 2003

(65) Prior Publication Data

US 2004/0130824 A1 Jul. 8, 2004

(30) Foreign Application Priority Data

Sep. 27, 2002 (JP) .............................. 2002-283193

(51) Int. Cl.
*G11B 5/60* (2006.01)
*G11B 21/21* (2006.01)

(52) U.S. Cl. ...................................................... 360/244
(58) Field of Classification Search ................. 360/244
See application file for complete search history.

(56) References Cited

U.S. PATENT DOCUMENTS 5,936,803 A * 8/1999 Berding ................... 360/244.8
6,304,420 B1 * 10/2001 Murphy et al. ........... 360/245.7
2002/0101796 A1 * 8/2002 Freeman et al. ............... 369/43
2003/0072108 A1 * 4/2003 Kawauchi et al. ........ 360/234.3
2004/0184193 A1 * 9/2004 Honda et al. ............. 360/244.2

FOREIGN PATENT DOCUMENTS

| JP | 08-227514 | 9/1996 |
| JP | 09-153277 | 6/1997 |
| JP | 10-283622 | 10/1998 |
| JP | 2002-237160 | 8/2002 |

* cited by examiner

*Primary Examiner*—Julie Anne Watko
(74) *Attorney, Agent, or Firm*—Wenderoth, Lind & Ponack, L.L.P.

(57) ABSTRACT

A head support device is thin and assures excellent flexibility and shock resistance while applying a sufficient load to a head. A disk drive uses the head support device. The head support device comprises a support arm, a head disposed at one end of the support arm, which is mounted on a head slider so as to be opposed to a recording medium, an elastic member such as a plate spring which provides the support arm an activating force in a direction perpendicular to the recording medium when the support arm comes to a rotational center in vertical rotation against the recording medium, and a holder connected to the elastic member. When an external impact force is applied to the head slider, with a distance from an action point of load that activates the head slider toward the recording medium to an immovable point in the rotation of the head slider in a direction of pitch being Lo, and a length of head slider in a direction of air flow being Ls, then $0.5 < Lo < Ls < 2$.

31 Claims, 18 Drawing Sheets

APPARATUS WITH HEAD AND HEAD SUPPORT DEVICE HAVING ROTATION SUPPORTING POINT

FIELD OF THE INVENTION

The present invention relates to a head support device using a head slider provided with a floating type head for performing recording and reproducing operation on a disk-like recording medium such as a magnetic disk and optical magnetic disk, and a disk drive for performing recording and reproducing operation by using the head support device.

BACKGROUND OF THE INVENTION

Recently, there has been a remarkable advance in technology of a disk drive (hereinafter also called a disk recording and reproducing unit) for performing recording and reproducing operation on a disk-like recording medium (hereinafter also called a recording medium) such as a hard disk and optical disk, and use is expanding in various fields in addition to its conventional use for computers. Such a disk drive is further required to be capable of higher density recording, stable recording and reproducing without damage to recording medium or the head slider even in case of receiving disturbance such as shocks, and is also required to be reduced in size so that it can be mounted on portable equipment.

As an example of a head support device of a disk drive having a conventional floating type head, a conventional head support device in a magnetic recording and reproducing unit such as a hard disk drive will be described by using the drawings.

FIG. 17 is a plan view showing a configuration of a head support device of a conventional magnetic recording and reproducing unit, and also showing a relationship between the head support device and magnetic recording medium (hereinafter also called disk).

In FIG. 17, head support arm 108 of head support device 100 comprises support arm 102 which is relatively low in rigidity, plate spring 103, and support arm 104 which is relatively high in rigidity, and head slider 101 provided with a magnetic head (not shown) is disposed on an underside of one end portion of the support arm 102.

Also, magnetic recording medium 107 is arranged so as to be rotated by spindle motor 109, and when the magnetic recording and reproducing unit is operated, the magnetic head mounted on the head slider 101 obtains a given amount of floatation due to a relationship between buoyancy created by air flow produced by rotation of the magnetic recording medium 5107 and activation of the head support device 100 which activates the head slider 101 toward the magnetic recording medium 107.

The head support device 100, during recording and reproducing operations, is rotated about bearing portion 105 via action of voice coil 106 disposed on the support arm 104, and thereby, the magnetic head mounted on the head slider 101 is positioned against a desired track of the magnetic recording and reproducing medium 107 in order to execute the recording and reproducing operation.

Next, configuration and action of a conventional head support device will be described in detail with reference to FIG. 18.

FIG. 18 is a perspective view of an essential portion of head support arm 108 comprising support arm 102, and head slider 101, in a conventional head support device. The head slider 101 is fixed on tongue-like portion 113 disposed at an end of flexure 115. Also, another end of the flexure 115 is fixed on the support arm 102. For example, a ginbal spring is used as the flexure 115, which is configured so as to be able to pitch and roll against the head slider 101. The head slider 101 is fixed onto the flexure 115, for example, by using adhesive, while the flexure 115 is fixed onto the support arm 102, for example, by welding. An end portion of support arm 102 is provided with dimple 114 which serves to apply a load to the head slider 101, and a predetermined load is applied to the head slider 101 via the dimple 114. The configuration of the head support arm 108 includes the support arm 102 having the dimple 114, the flexure 115 having the tongue-like portion 113, and the head slider 101.

By using such head support arm 108, when a recording and reproducing operation is executed on a magnetic recording and reproducing medium 107 (not shown in FIG. 18) while being rotated, the head slider 101 is subjected to three forces such as a load applied via the dimple 114, a positive force that acts to cause the head slider to rise up from the magnetic recording medium due to air flow, and a negative force that acts to cause the head slider to approach the magnetic recording medium, and then, the head slider 101 is floated due to balance of these forces, and in a state of maintaining an amount of floatation, the head slider executes the recording and reproducing operation via an information conversion element (not shown) while driving a rocking device for positioning the head slider to a predetermined track position.

However, in the conventional disk drive, when external shocks are applied to the unit, the head slider bumps against or comes into contact with a recording medium, causing the head slider and the recording medium to be worn or damaged, which may sometimes result in breakdown of data or damage to the disk drive. Accordingly, a method for preventing external vibration from being transmitted to a main body of the disk drive is proposed (for example, refer to Japanese Laid-open Patent H9-153277) in that there is provided a fitting member for receiving external vibration, and a main body of the disk drive is bonded to the fitting member by using a flexible heat insulating member. Thus, a disk drive which is strong against external vibration can be realized, but the disk drive in its entirety is relatively large in size, and it is difficult to mount such a disk drive in portable equipment required to be small-sized and light-weight.

Accordingly, it is necessary to improve shock resistance of a head slider and support arm, or head support arm itself, and at the same time to achieve objectives such as miniaturization of a disk drive and improvement of its shock resistance. Particularly, since the head slider is opposed to a recording medium while maintaining a delicate amount of floatation against the recording medium, it is required to prevent the head slider and the recording medium from being seriously damaged when shocks are applied thereto. However, a shape of a surface of the head slider opposing the recording medium is not usually devised for a purpose of improving shock resistance, but in many cases, improvements are made in various ways in order to stabilize an amount of floatation at an air outflow side of the head slider where an information conversion element is disposed, as against variations of skew angle and atmospheric pressure.

For example, there is a proposal of a head slider configuration such that a positive pressure generating section for generating great positive pressures, and a negative pressure generating section for generating negative pressures, are concentrated at an air outflow side of the head slider in order to increase rigidity of an air layer at the air outflow side (for example, refer to Japanese Laid-open Patent H-10-283622). In such a configuration, when the head slider pitches and changes in its floating posture, there exists a point as a focal point at which an amount of floatation does not vary, and a position of this focal point can be near an air outflow end of the head slider where an information conversion element is disposed. In this way, it is possible to execute stable recording or reproducing of information almost without change in an amount of floatation of the head slider near the information conversion element due to action of positive and negative pressures even in case of variations of skew angle, atmospheric pressure, external forces due to rocking, or load.

Also, as a head slider structure for reliably realizing a low-level amount of floatation, there is a proposal of a head slider configured in that there exists a position as an immovable point at which an amount of floatation does not vary, and the immovable point is positioned at an air outflow end side of the head slider (for example, refer to Japanese Laid-open Patent H8-227514). That is, in a head slider wherein, when a push load is applied in a direction of a recording medium, a positive pressure is generated that acts to float the head slider with viscous flow of air generated by rotation of the recording medium, and a negative pressure is generated by air flowing into a groove formed in a head slider surface, the head slider is constructed such that a center of negative pressure generation is positioned a little closer to an air inflow side of the head slider than to an action point of the push load.

Due to this structure, when an external force (moment) acts on the head slider to move it upwardly, a negative force acts to cope with the external force so that the head slider can be maintained in a stable state. That is, it is disclosed that even when an external force acts to move the head slider upwardly, a negative force will act against the external force, and since the air outflow end side of the head slider fitted with an information conversion element is substantially a rotational center of balance or an immovable point, a distance from the information conversion element to a recording medium surface remains almost unchanged.

As described above, in a head support device of a magnetic recording and reproducing unit, it has been necessary to apply a predetermined load to the head slider in a direction of a magnetic recording medium in order to prevent off-tracking of a magnetic head, mounted on the head slider, by maintaining the head slider in a stable state of floating even in case of external shock or vertical movement of the magnetic recording medium during a recording and reproducing operation. Also, during a recording and reproducing operation of a magnetic recording medium, it has been necessary for a head support device to have appropriate flexibility so that a head slider may follow vertical movement or the like of the magnetic recording medium. Further, in order to reduce size of a magnetic recording and reproducing unit, to reduce thickness in particular, it has been necessary to thin a head support device in a direction vertical to a magnetic recording medium surface.

However, in a conventional head support device, as described above, since it is configured in that a support arm is connected by a plate spring to a coupling portion, it is required to satisfy incompatible requirements in order to satisfy various requirements of the head support device. That is, specifically, firstly to obtain a stable floating status of a head slider with a magnetic head mounted thereon, it has been necessary for the plate spring to have a reaction force that is sufficient to apply a necessary load to the head slider.

Also, it has been necessary for the head support device to have appropriate flexibility in order to prevent a load applied by the head slider to a magnetic recording medium from being varied due to a vertical movement of the magnetic recording medium, or manufacturing variations or the like of a distance between the head slider and the magnetic recording medium of every magnetic recording and reproducing unit in mass-production. In the conventional head support device, it has been designed that there is provided a notch in plate spring 103 as shown in FIG. 17, which serves to lower rigidity of the plate spring 103 and to lessen a spring constant for a purpose of providing the date spring with flexibility.

Also, in case the support arm is structurally thinned in order to lower rigidity of the plate spring, frequency at a main resonance point, that is so-called resonant frequency, is low and causes a vibration mode such as twisting when the head support device is moved for positioning, and consequently, it takes much time for settling a vibration mode generated, resulting in a shortening of access time.

Further, in the conventional head support device, since a center of gravity is positioned a little closer to the magnetic head than to the plate spring, when strong shock or the like is exteriorly applied to the magnetic recording and reproducing unit, buoyancy due to air flow generated due to rotation of a magnetic recording medium is unbalanced against an activating force of the head support device which activates the head slider toward the magnetic recording medium, and then a phenomenon takes place such that the head slider jumps from the magnetic recording medium. As a result, the head slider bumps against the magnetic recording medium and may cause magnetic damage or mechanical damage to the magnetic recording medium.

Also, in the above example of a head slider, to prevent variation of an amount of floatation at an air outflow end of the head slider where an information conversion element is disposed, a surface of the head slider opposing a magnetic recording medium is provided and a load action point is arranged so that an immovable point or focal point is positioned at the air outflow end of the head slider. Accordingly, even when a floating posture is changed due to variation of a skew angle, atmospheric pressure, or load, an amount of floatation can be stabilized at an air outflow end side where the information conversion element is disposed. However, comparing such variation with an exteriorly applied shock, the shock is far greater than the variation, and therefore, it cannot be said that the proposal described above is effective to cope with shocks.

That is, when a great shock is applied to the head slider of which the immovable point or the focal point is positioned at the air outflow end, there may arise a situation such that the head slider is of negative pitch angle; that is, an amount of floatation at the air inflow end side of the head slider is less than an amount of floatation at the air outflow end side of the head slider. In this case, it is unable to form an air layer between the surface of the head slider opposing a magnetic recording medium and a surface of the magnetic recording medium, and thus the head slider does not float at all and is damaged due to bumping against the recording medium.

Also, in the proposal, the point at which an amount of floatation remains unchanged even in case of variation in skew angle or the like is defined as the focal point, and the surface of the head slider opposing the magnetic recording medium is shaped so that the position corresponds to the air outflow end of the head slider. Thus, nothing is mentioned about whether or not the immovable point corresponds to the focal point when external shocks are applied to the head slider.

Further, regarding a proposal of a configuration such that a position at which an amount of floatation remains unchanged is an immovable point, and the immovable point is positioned at an air outflow end side of the head slider, an amount of floatation at the air outflow end side of the head slider can be controlled in a case of such a rotational moment as to move the head slider upwardly, but in a direction perpendicular to a recording medium surface, especially in a case of a downward shock applied to the recording medium surface, where the head slider may bump against the recording medium surface even due to a slight shock.

Moreover, in a disk drive mounted in portable equipment, it is necessary to reduce a diametric size of a recording medium and also to lower a recording medium rotating speed, and speed of air flow on a surface of a head slider opposing the recording medium becomes lower as compared with the prior art. In case the recording medium rotating speed is at a low level, when a negative pitch angle is generated at the head slider due to shock, an air layer cannot be formed, and a possibility of bumping against the recording medium is very much increased, but nothing is disclosed about this matter in the above examples.

The above problems are not peculiar to a magnetic recording and reproducing unit, and there have arisen similar problems in a disk drive having a floating type head such as an optical disk drive and optical magnetic disk drive.

SUMMARY OF THE INVENTION

The present invention is intended to solve these problems, and an object of the invention is to provide a head support device comprising a head slider whose shock resistance is improved because the head slider rotates in a direction of pitch when an external shock is applied to the head slider, which ensures high flexibility while applying an adequate load to a head on the head slider, which is thin and assures excellent shock resistance. Another object of the invention is to provide a disk drive using such a head support device.

In order to solve the problems, the head support device of the present invention comprises, a support arm, with a head disposed at one end of the support arm, an elastic member formed near another end of the support arm, and a first base arm having a coupling portion projected at one end of the first base arm, wherein an end of the elastic member is fixed to the first base arm, and the support arm or the first base arm is provided with a vertical rotation supporting point. Also, the head support device can comprise a head, a support arm with the head disposed at one end thereof and an elastic member formed near another end thereof, and a first base arm having a coupling portion projected at another end, wherein an end of the elastic member is fixed on the first base arm, and the support arm or the first base arm is provided with a vertical rotation supporting point, and the head is disposed apart from the vertical rotation supporting point in a longitudinal direction of the support arm, opposing a recording medium of the head slider. Also, the head support device can be configured in that near another end of the support arm at an opposite side of the head, the elastic member is formed in one-piece with the support arm along a longitudinal center line of the support arm. Also, the head support device can be configured in that the head is mounted on a head slider, and the head slider is fitted on one end of the support arm via flexure. Also, the head support device can be configured in that a balancer is fitted on another end of the support arm across the vertical rotation supporting point from the head slider. Also, the head support device of the present invention can be configured in that a surface of the head slider opposing a recording medium is such that, when an external shock is applied to the head slider, suppose a distance from an action point of load that activates the head slider in a direction of the recording medium to an immovable point when the head slider rotates in a direction of pitch is Lo; a length in an air flow direction from an air inflow end of the head slider to the air outflow end thereof is Ls; then 0.5<Lo<Ls<2, and when an external shock is applied to the head slider, suppose the distance from the action point of load that activates the head slider toward the recording medium to the immovable point when the head slider rotates in the direction of pitch is Lo; the length in the direction of air flow from the air inflow end of the head slider to the air outflow end thereof is Ls; a pitch angle of the head slider being afloat over a recording medium surface is θp; and an amount of floatation from the recording medium surface at the air outflow end of the head slider is Xt, then $1 \leq Lo/Ld \leq 2.5$, where $Ld=(Ls/2)+(Xt/\tan(\theta p))$. Also, the head support device of the present invention can be configured in that the elastic member is symmetrical about a center line in the longitudinal direction of the support arm and peripherally provided with a U-shaped, V-shaped or ⊐-shaped through-hole. Also, the head support device of the present invention can be configured in that the vertical rotation supporting point disposed on the support arm or the first base arm has two pivots. Also, the support device of the present invention can be configured in that an overall center of gravity as a total center of gravity of the head slider, flexure, support arm and balancer is positioned on a plane vertical to a recording medium including a line that connects respective peaks of the two pivots, thereby setting mass of the balancer, a center of gravity position, and a fitting position. Also, the head support device of the present invention can be configured in that the two pivots are disposed symmetrically about the center line in the longitudinal direction of the support arm. Also, the head support device of the present invention can be configured in that a side reinforcement is disposed on a side surface of the head slider in a longitudinal direction of the support arm or a side reinforcement is formed by bending. Also, the head support device of the present invention can be configured in that there is provided a second base arm having a hole for connection to a coupling portion of the first base arm at one end of the second base arm, a bearing portion, and a driving device on another end of the second base arm. Also, the head support device of the present invention can be configured in that the immovable point is obtained from a ratio of rotational rigidity of an air layer generated between the surface of the head slider opposing a recording medium and the recording medium to rotational rigidity as against perpendicular displacement. Also, the head support device of the present invention can be configured in that a positive pressure generator disposed on the surface of the head slider opposing the recording medium comprises a first positive pressure generator formed at a predetermined position so as to be perpendicular to direction of air flow from an air inflow end of the head slider, and a second positive pressure generator formed at a predetermined position from an air outflow end at a widthwise center vertical to air flow direction of the head slider, and that the negative pressure generator is formed between the first positive pressure generator and the second positive pressure generator, and a negative pressure center is positioned nearer to the air outflow end side than to an action point of load that activates the head slider toward the recording medium. Also, the head support device of the present invention can be configured in that side rails are disposed on either side in a widthwise direction of the head slider for a purpose of connection to the first positive pressure generator. Also, the head support device of the present invention can be configured in that the negative pressure generator is disposed in a nearly surrounded region at a middle stage that is lower than a surface of the positive pressure generator and higher than a surface of the negative pressure generator with reference to the surface of the positive pressure generator. Also, the head support device of the present invention can be configured in that the action point of load that activates the head slider toward the recording medium is a center of gravity of the head slider. Also, the head support device of the present invention can comprise a head support arm provided with a head slider holding member which holds the head slider, and a support arm which fixes another end of the head slider holding member. Further, the head support device of the present invention can be configured in that suction toward a recording medium generated on an air lubricated surface of the head slider is greater than an equivalent mass of the head support device.

By using these configurations, it is possible to provide a head support device which is excellent in flexibility and shock resistance and capable of high-speed access while applying an adequate load to the head, and also, the support arm supported on a pivot as a vertical supporting point is able to freely rotate in a direction perpendicular to a recording surface of the recording medium, thereby realizing a head support device that may execute novel operation unlike the prior art.

Further, by using these configurations, no rotational force against external shock is generated around the line (rotational axis) that connects the respective peaks of the two pivots disposed on one of the first base arm and the support arm, and therefore, the head slider can be prevented from bumping against a recording medium surface and causing damage to the recording medium or head mounted on the head slider. Accordingly, it is possible to realize a head support device which is stable and free from excessive vibrations.

Also, in order to solve the above problems, the disk drive of the present invention comprises a recording medium with a recording medium layer formed on a surface thereof, a rotating device for rotating the recording medium, and a head support device provided with a head slider with a head mounted on one end and a driving device mounted on another end thereof. The head support device includes a support arm with a head disposed on one end thereof and an elastic member integrally formed along a longitudinal center line near another end thereof, a balancer fitted on another end of the support arm, and a first base arm having a projected coupling portion on one end thereof, and an end portion of the elastic member is fixed on the first base arm, and the support arm or the first base arm is provided with a vertical rotation supporting point. Also, the disk drive of the present invention can comprise a recording medium with a recording medium layer formed on a surface thereof, a rotating device for rotating the recording medium, and a head support device provided with a head slider with a head mounted on one end thereof and a driving device mounted on another end thereof. The head support device includes a support arm with a head disposed on one end thereof and an elastic member integrally formed along a longitudinal center line near another end thereof, a balancer fitted on another end of the support arm, and a first base arm having a projected coupling portion on one end thereof, and an end portion of the elastic member is fixed on the first base arm, the support arm or the first base arm is provided with a vertical rotation supporting point, and the head, opposing recording medium, is positioned apart from the vertical rotation supporting point in a longitudinal direction of the support arm.

By using these configurations, a head support arm comprising a stable head support device can be realized, and it is possible to realize a disk drive which ensures high shock resistance and excellent reliability such as high-speed access.

Further, the head slider can be prevented from bumping against a recording medium surface, or bumping energy can be reduced, to prevent the head slider or the recording medium from being damaged even when great shock is applied to the head slider in a state of being afloat over the recording medium. Accordingly, it is possible to manufacture a head support device and a disk drive ensuring excellent reliability and also to mount a large-capacity, compact and thin disk drive in portable equipment.

DETAILED DESCRIPTION OF THE PREFERRED EMBODIMENTS

The preferred embodiments of the present invention will be described in the following with reference to the drawings.

First Preferred Embodiment

First, a principle of operation of a head support device in a first preferred embodiment of the present invention is described by using a magnetic recording and reproducing unit as an example.

Figure 1A:
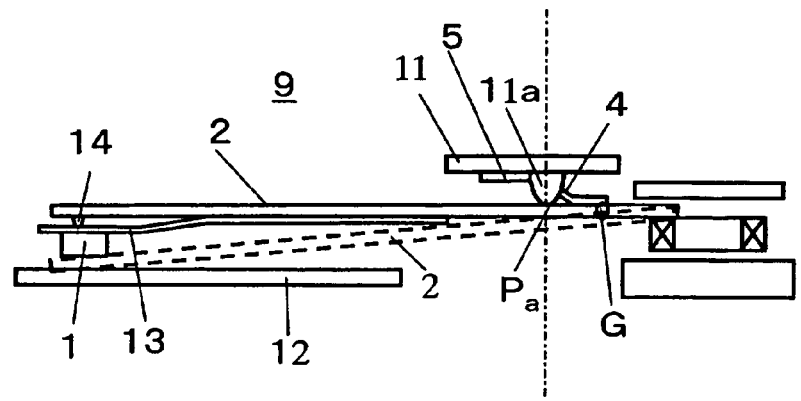
FIG. 1(a) is a side view showing a general configuration of a head support device in a first preferred embodiment of the present invention.
Figure 1B:
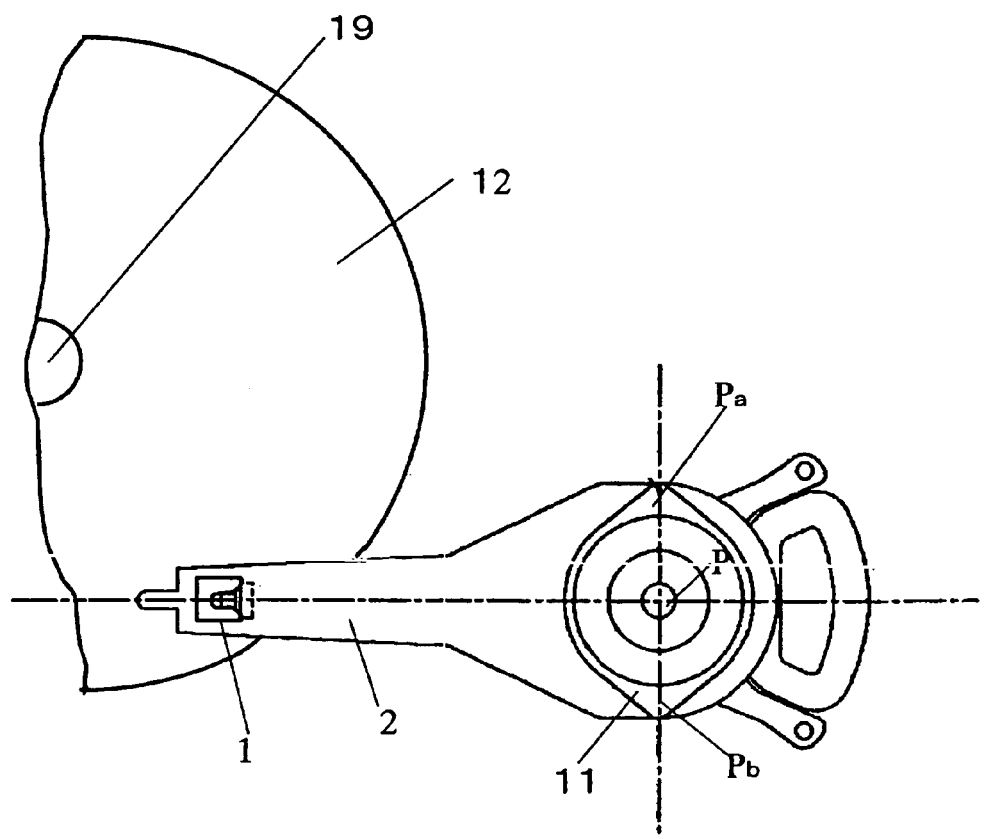
FIG. 1(b) is a plan view showing the general configuration of the head support device in the first preferred embodiment of the present invention.

FIG. 1(a) is a side view showing a general configuration of a head support device in the first preferred embodiment of the present invention, and FIG. 1(b) is a plan view of the same.

In FIGS. 1(a) and 1(b), head slider 1 mounted with a magnetic head element (not shown) for recording and reproducing purposes is fitted on a surface, opposing recording medium 12, of support arm 2 so that the head element is opposed to the recording medium 12. As described later, the support arm 2 is supported by first bearing portion 10 and second bearing portion 11, which support arm is able to rotate radially of the recording medium 12 due to the first bearing portion 10 and is also able to turn vertically, making a so-called "up-and-down directional gate panel" motion, against a surface of the recording medium 12 due to the second bearing portion 11.

The recording medium 12 is journaled on spindle motor 19 that is a rotating device, and in a recording or reproducing mode of the magnetic recording and reproducing unit; that is, with a magnetic head loaded, the magnetic head mounted on the head slider 1 executes a recording or reproducing operation, obtaining a specific amount of floatation against the recording medium 12, due to a relationship between buoyancy created by air flow generated by rotation of the recording medium 12 and action of head support device 9 which activates the head slider 1 toward the recording medium 12.

In FIGS. 1(a) and 1(b), the support arm 2 of which the head slider 1 with the magnetic head disposed on an underside thereof is mounted on an underside of one end of the support arm is fitted, at the another end, to one end portion of plate spring 4, which is an elastic member as shown, and another end portion of the plate spring 4 is fitted to the second bearing portion 11 via spring fixing member 5.

In this way, the support arm 2 is resiliently held on the second bearing portion 11 via the plate spring 4.

Also, the second bearing portion 11 is provided with a pair of pivots 11a and 11b (not shown), and the pivots 11a, 11b come into contact with the support arm 2 respectively at points Pa and Pb as shown in FIG. 1(b), and the one end portion of the support arm 2 is activated toward the recording medium 12 due to an elastic force of the plate spring 4, thereby generating compressive stresses at contact points Pa and Pb. In case of no recording medium 12, the plate spring 4 will be deformed, causing the support arm 2 to be positioned as shown by dotted lines in FIG. 1(a).

The pivots 11a and 11b of the second bearing portion 11 are perpendicular to an axial direction of a rotational center with the support arm 2 rotated radially of the recording medium 12, are also perpendicular to a longitudinal direction of the support arm 2, and are provided so as to come into contact with the support arm 2 on a line passing through the rotational center.

During operation of the magnetic recording and reproducing unit, or when the head slider 1 is afloat against the recording medium 12, a load to the head slider 1 is generated by compressive stress in a direction of the recording medium 12 to the support arm 2 due to the pivots 11a and 11b of the second bearing portion 11.

By using such a configuration of the head support device 9, the support arm 2 can be formed from a highly rigid material. Accordingly, it is possible to form the head support device 9 by using a highly rigid material over an entire range from the second bearing portion 11, the pivots 11a, 11b of the second bearing portion 11, and a region of the support arm 2 supported by the second bearing portion 11 to a region where the head slider 1 is formed.

In this way, the support arm 2 is formed from a highly rigid material, and a resonance frequency of the support arm 2 can be enhanced. Accordingly, there is no generation of a vibration mode that has been a conventional problem, and no settling operation is required. As a result, high-speed rotation and positioning of the support arm 2 is possible, and it becomes possible to improve an access speed of the magnetic recording and reproducing unit.

Also, the plate spring 4 is not built into structure of the support arm 2, but rather is disposed independently of the support arm 2. Therefore, it is possible to select a strength and spring constant of the plate spring 4 by changing thickness, material or the like of the plate spring 4.

Also, in a configuration using the head support device 9, by designing the head support device in such manner that a center of gravity of a portion held by the plate spring 4, for example, when rotated by a voice coil motor, a center of gravity of the support arm 2 in a state of being fitted with a voice coil and coil holder, is substantially same in position as a point of intersection between the rotational axis in the radial direction of the recording medium 12 of the support arm 2 and the rotational axis in the vertical direction of the recording medium 12; that is, middle point P on a line connecting points Pa and Pb at which the support arm 2 comes in contact with the pivots 11a, 11b of the second bearing portion 11 (in FIG. 1(a), a distance between P and Pa becomes equal to a distance between P and Pb, which is L), it is possible to provide a head support device which is free from vibration and is stable. In this case, it is possible to provide a head support device maximized with regard to shock resistance, but some difference causes no problem in actual use.

Further, as shown in FIG. 1(a), by supporting the head slider 1 with flexure 13 formed on the support arm 2 via dimple 14 formed on an underside at one end of the support arm 2, it is possible to realize a head support device which is flexible enough to follow unnecessary vibrations or the like in a direction of pitch or roll of the head slider 1 against the recording medium 12 during operation of the magnetic recording and reproducing unit.

As described above, in the head support device of the present invention, incompatible requirements for increasing load to the head slider, enhancing flexibility, and further improving rigidity of structure can be satisfied independently of each other as individual component elements, and design of the head support device is simplified and it is possible to remarkably expand freedom of design.

Furthermore, in the head support device of the present invention, since no forming (bending) is required of very accurate elastic members (such as a plate spring), unlike a conventional head support device, it is possible to manufacture a head support device by a simpler method as compared with the prior art.

Operation of the head support device of the present invention will be described in the following by using FIGS. 1(a) and 1(b).

As described above, when the recording medium 12 is stopping, the head slider 1 and the recording medium 12 are stopping in contact with each other, but as the recording medium 12 starts rotating for recording and reproducing operation, the head slider 1 is floated and the plate spring 4 is deformed, causing the support arm 2 to aatain an orientation as shown by solid lines in FIG. 1(a), so as to execute magnetic recording and reproducing operation, while keeping a specific clearance between the magnetic head and the recording medium 12.

In this case, a reaction force of the plate spring 4 that acts to return the support arm 2 to a state shown by dotted lines in FIG. 1(a) is a load to be applied to the head slider 1.

This load can be varied by changing material and thickness of the plate spring 4, height of the pivots 11a and 11b of the second bearing portion 11, or a position of point G as shown in FIG. 1(a), which point corresponds to a joint between the support arm 2 and the plate spring 4.

For example, the load applied will become greater if the plate spring 4 is formed thicker by using a material of higher rigidity, and also, a greater load can be applied to the head slider 1 by heightening the pivots 11a and 11b of the second bearing portion 11 or by positioning point G closer to point P.

Next, following description of an operational principle of the head support device in the first preferred embodiment of the present invention, the configuration of the head support device of the present invention will be described in a little more detail.

Figure 2:
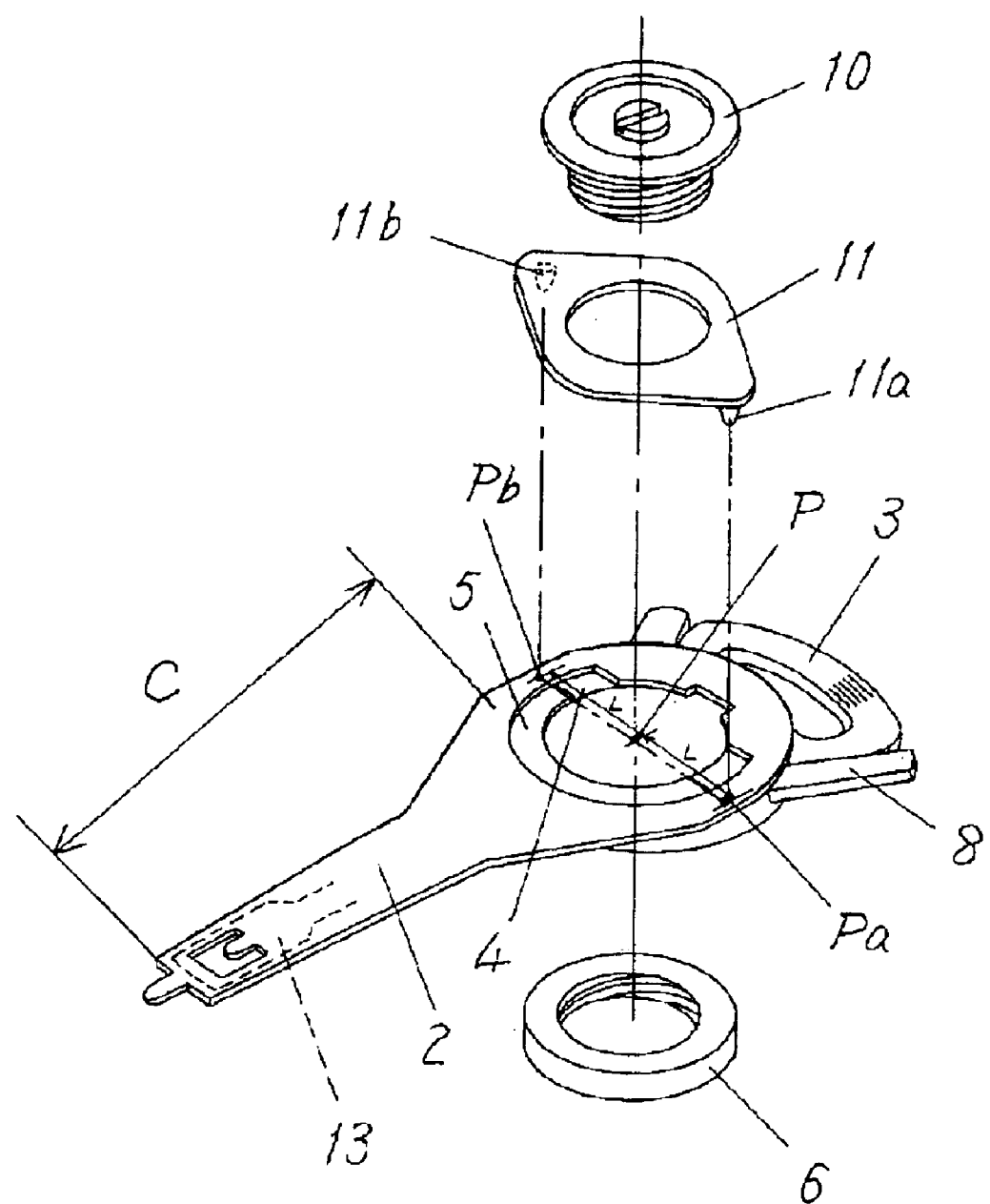
FIG. 2 is a perspective view showing a configuration of the head support device in the first preferred embodiment of the present invention.
Figure 3:
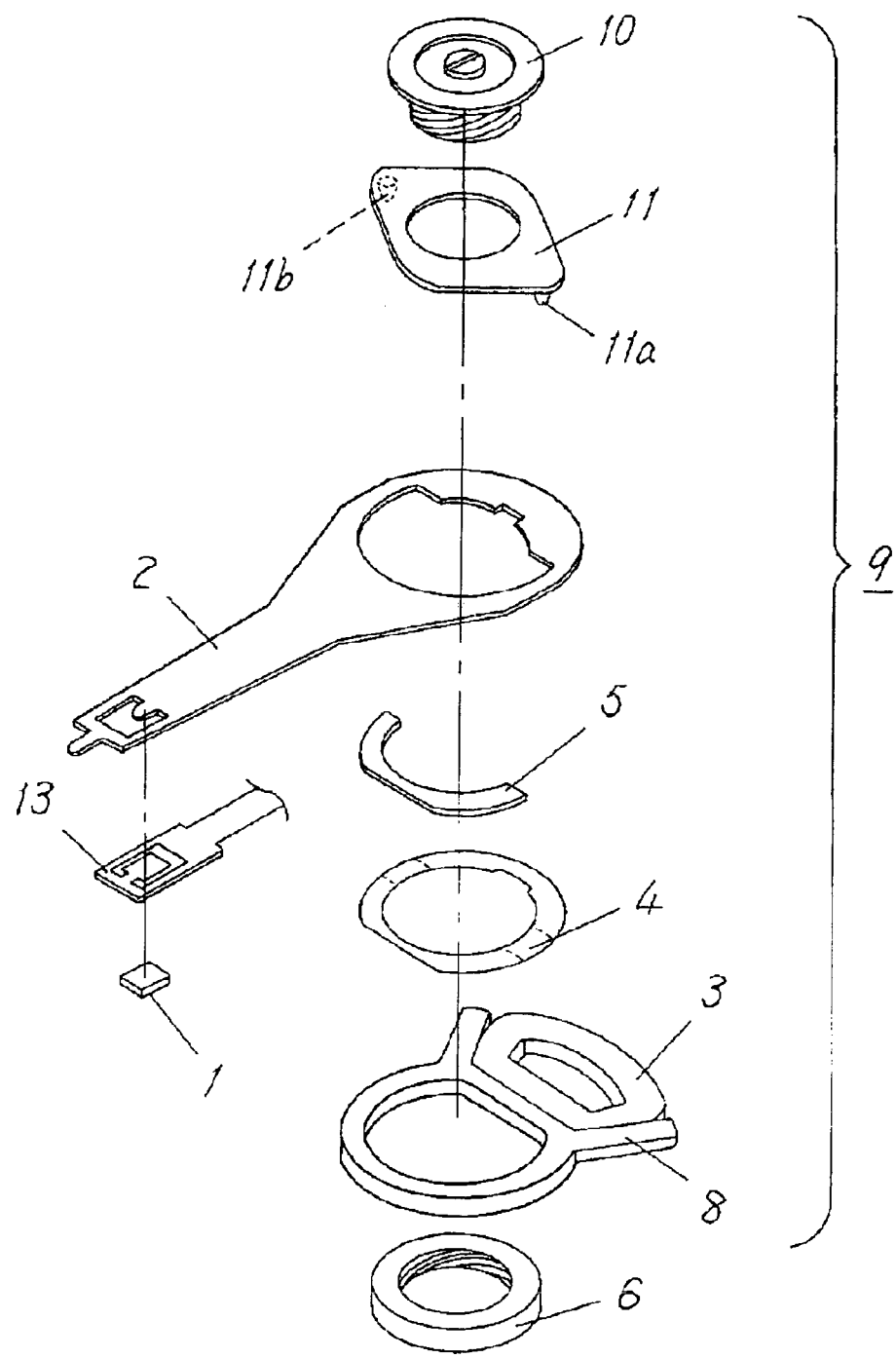
FIG. 3 is an exploded perspective view showing the configuration of the head support device in the first preferred embodiment of the present invention.
Figure 4:
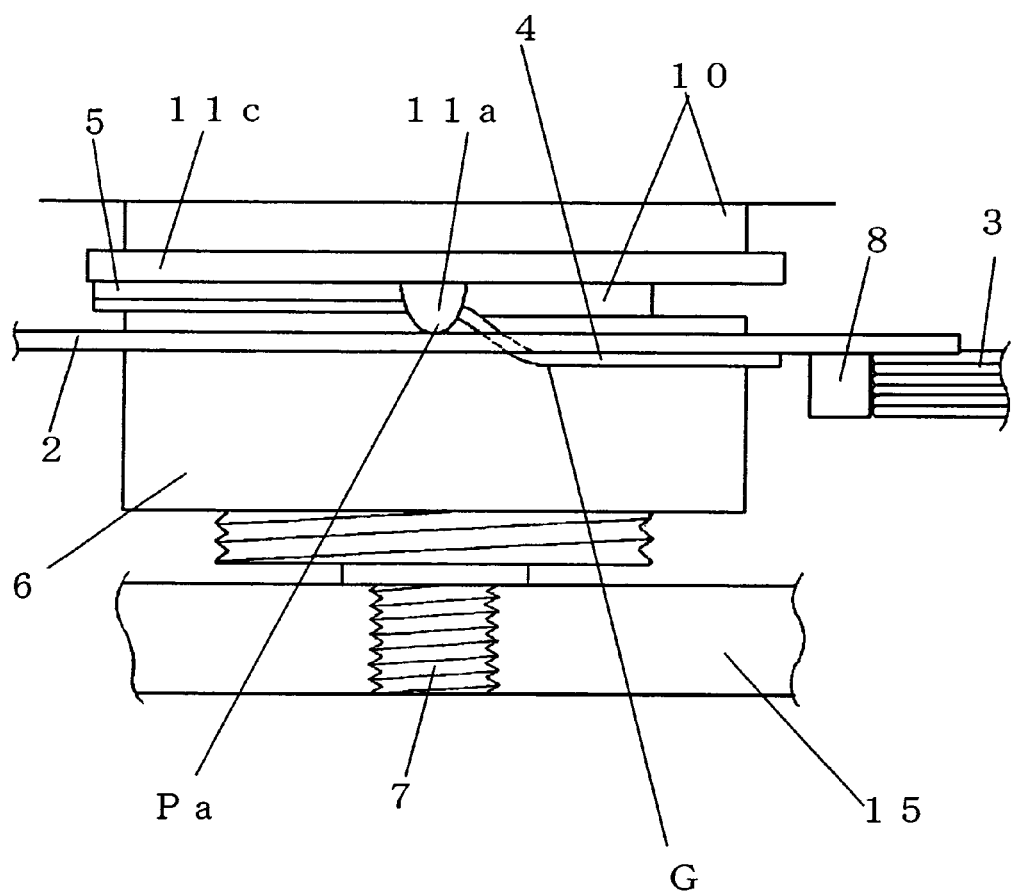
FIG. 4 is a side view of essential parts near a bearing portion of the head support device in the first preferred embodiment of the present invention.

FIG. 2 is a perspective view showing a configuration of the head support device in the first preferred embodiment of the present invention. FIG. 3 is an exploded perspective view of the head support device in the first preferred embodiment of the present invention. FIG. 4 is a side view of essential parts near the bearing portions of the head support device in the first preferred embodiment of the present invention.

As shown in FIG. 2 and FIG. 3, the head support device 9 is configured such that a nearly annular plate spring (elastic member) 4 and a semi-circular annular spring fixing member 5 are connected to each other, and the plate spring 4 is also connected to the support arm 2. The support arm 2 is connected to a coil holder 8 fitted with voice coil 3 in such manner that the support arm can be rotated in a radial direction of the recording medium 12 by virtue of a voice coil motor. These members are held between the bearing portion 10 and a nut 6 together with the second bearing portion 11.

Also, as shown in FIG. 4, the head support device 9 in its entirety is fastened to substrate 15 by virtue of a screw 7 of the bearing portion 10.

Connection of each member will be described in further detail by using FIG. 4. First, at the right-hand side of the rotational axis in this figure, a top surface of the plate spring 4 (elastic member) is connected with an underside of the support arm 2, and at the left-hand side thereof, the plate spring 4 and the spring fixing member 5 are held between the bearing portion 10 and nut 6 together with a collar 11c of the second bearing portion 11. Also, the support arm 2 is fitted onto the coil holder 8.

By using such a configuration, it is possible to realize a configuration in which the plate spring 4 deforms so as to bend in two steps as shown in FIG. 4, thereby resiliently retaining the support arm 2.

Also, the bearing portion 10 is equipped with a bearing so that the support arm 2 may rotate in the radial direction of the magnetic recording medium in order to move the magnetic head disposed on the underside at one end of the support arm to a predetermined position.

The pivots 11a and 11b of the second bearing portion 11 are perpendicular to an axial direction of the bearing portion 10 and also to the longitudinal direction of the support arm 2, which pivots are disposed so as to come into contact with the support arm 2 on the line passing through the rotational center of the support arm.

Further, the pivots 11a and 11b of the second bearing portion 11 are disposed in positions symmetrical to a center line in the longitudinal direction of the support arm 2, and the support arm 2 is pushed downwardly by the pivots 11a, 11b.

Also, by designing the head support device 9 in such manner that the center of gravity of the portion held by the plate spring 4, that is, the center of gravity of the support arm 2 in a state of being fitted with voice coil 3 and coil holder 8, is substantially same in position as middle point P on the line connecting points Pa and Pb at which the support arm 2 comes into contact with the pivots 11a, 11b of the second bearing portion 11 (as shown in FIG. 1(a), the distance between P and Pa becomes equal to the distance between P and Pb, which is L), it is possible to provide a head support device which is stable and less influenced by external vibration or the like. In this case, it is possible to provide a head support device maximized in terms of shock resistance, but some difference causes no problem in actual use.

Also, taking into account weight of the head slider 1 and flexure 13, it is also preferable to form the head support device 9 so that the center of gravity of the support arm 2 in a state of being fitted with the voice coil 3, coil holder 8, head slider 1 and flexure 13 is substantially same in position as point P.

Each of these members will be described in the following. First, the support arm 2 is integrally formed so as to be 64 μm in thickness by using a metal, for example, stainless steel (SUS304). An etching process or press machining process can also be employed for forming the support arm 2.

By using a support arm 2 formed in this way, resonance frequency of its twisting can be greatly increased from about 2 kHz, a conventional level, to about 10 kHz. Accordingly, it is possible to obtain a magnetic recording and reproducing unit of which rotational speed and access speed of the head support device are very high.

By using such support arm 2, resonance frequency of its bending can be greatly increased from about 200 Hz, a conventional level, to about 2 kHz. Accordingly, it is possible to obtain a magnetic recording and reproducing unit of which rotational speed and access speed of the head support device are very high.

As a result, it is possible to suppress bending and deformation of the support arm 2 when shocks are applied thereto, and to prevent the support arm 2 from bumping against a recording medium.

It is also preferable to provide a bend of about 0.2 mm in height in a direction perpendicular to a recording surface of a recording medium in order to increase longitudinal rigidity in a region, shown by C in FIG. 2, of an end portion of the support arm 2.

Also, in FIG. 3, the head slider 1 is supported by flexure 13 in such manner as to be able to incline in a direction of roll and pitch via a dimple (not shown in FIG. 3), and there is provided a magnetic head on the surface of the head slider 1 opposing the recording medium.

The spring fixing member 5 is formed to be 0.1 mm in thickness by using a metal, for example, stainless steel (SUS304), and the plate spring 4 is formed to be 38 μm in thickness by using a metal, for example, stainless steel (SUS304). An etching process or press machining process can also be employed for forming these members.

Also, the coil holder 8 is formed to be 0.3 mm in thickness by using a metal, for example, Al or PPS (polyphenylsulfide). In the case of Al, a die casting process or press machining process can be employed for forming the coil holder, and in the case of PPS, a well-known resin forming process can be employed for forming the coil holder.

Also, for connection of each member, a spot welding process, supersonic welding process, laser beam machining process and the like can be employed.

The present invention is not limited at all with respect to the manufacturing method of each member or the method of connecting the members.

By using the configuration as described above, it is possible to provide a head support device which exhibits the principle as shown in the first preferred embodiment.

Also, by configuring the head support device 9 in this way, it is possible to realize a novel operation that has never been seen in any prior art because the support arm 2 fulcrumed on the pivots 11a and 11b of the second bearing portion 11 is able to freely rotate in a direction perpendicular to a recording surface of the recording medium.

For example, in a CSS type magnetic recording and reproducing unit, the prior art was unable to freely move the support arm in a vertical direction, and it was necessary to prevent the head slider from being attracted to a recording medium in a stop mode. However, according to the head support device of the present invention, the support arm can be vertically operated by a well-know device, and it is possible to keep the support arm slightly spaced from a recording medium while the magnetic recording and reproducing unit is in a stop mode. Accordingly, it is unnecessary to provide the recording medium with a region in which the magnetic head may take shelter.

Also, in an L/UL type magnetic recording and reproducing unit, the support arm can be vertically operated by a well-know device, and it is possible to keep the support arm slightly spaced from a recording medium while the magnetic recording and reproducing unit is in a stop mode. Accordingly, it is possible to minimize a wasteful region of the magnetic recording medium at which the magnetic head is loaded and unloaded as in the prior art.

Next, the head slider of the head support device in the preferred embodiment of the present invention will be described.

Figure 5A:
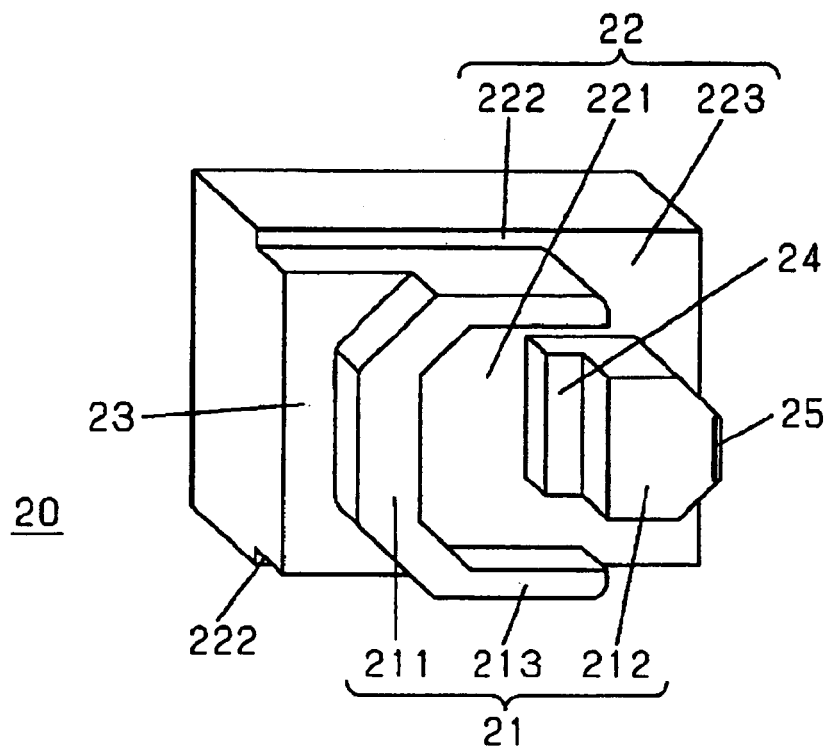
FIG. 5(a) is a perspective view from a surface of a head slider, disposed on a head support device in the first preferred embodiment of the present invention, opposing a recording medium.
Figure 5B:
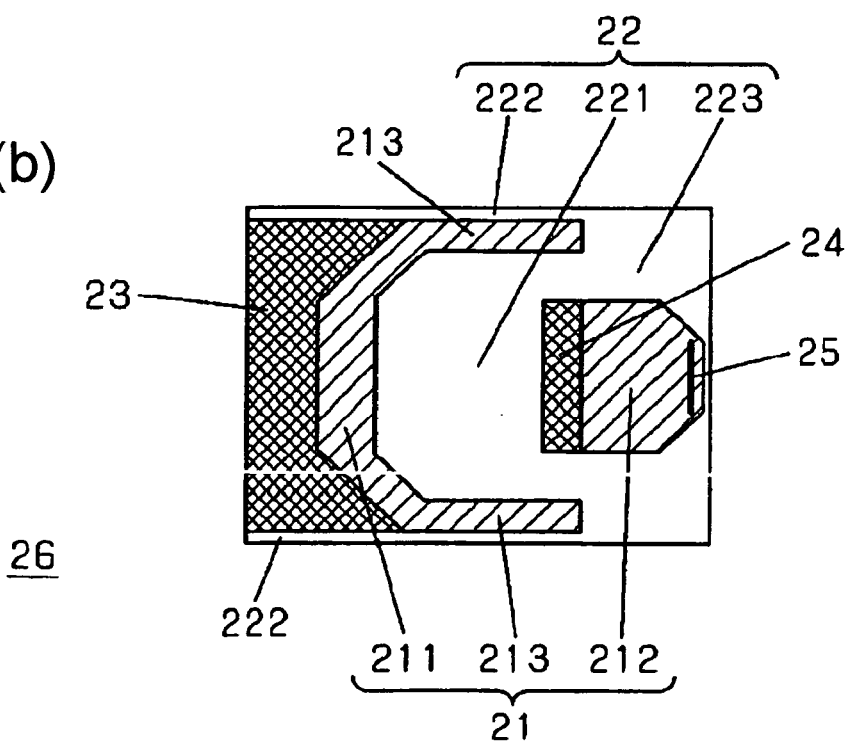
FIG. 5(b) shows the surface of the head slider disposed on the head support device in the first preferred embodiment of the present invention, opposing the recording medium.

FIG. 5(a) and FIG. 5(b) show a perspective view from a surface opposing a recording surface of the head slider mounted on the head support device in the first preferred embodiment of the present invention, and a surface opposing a recording medium thereof. Head slider 20 is provided with a surface 26 that opposes a recording medium, which surface is generally rectangular in shape. The surface 26 comprises positive pressure generator 21, lower stage 22 including negative pressure generator 221, first middle stage 23 formed so as to connect an air inflow end to a first positive pressure generator 211, and second middle stage 24 disposed so as to extend in an air inflow direction from a second positive pressure generator 212.

The positive pressure generator 21 comprises the first positive pressure generator 211, side rails 213 formed on either widthwise side of the head slider so as to be connected to the first positive pressure generator 211, and the second positive pressure generator 212, which has a hexagonal shape as shown, at a widthwise center perpendicular to a direction of a spindle that is direction of air flow at an air outflow side. The first positive pressure generator 211 extends continously from an air inflow end to a predetermined position that is spaced from an end of the first middle stage 23, and has a portion that is perpendicular to an air inflow direction and also has a slanted portion for connecting the perpendicular portion to each of the side rails 213. The lower stage 22 comprises the negative pressure generator 221, which is almost surrounded by the first positive pressure generator 211, side rails 213, and the second middle stage 24. The lower stage 22 also comprises side lower stage 222 positioned outwardly of the side rails 213, and air outflow side lower stage 223 disposed at an air outflow side. An information conversion element 25 is integrally arranged at an air outflow end of the second positive pressure generator 212.

Manufacturing processes can be executed by a method of head slider forming or general machining as well, but it is preferable to employ a wet or dry etching process or, in case of highly accurate and complicated machining, to use a method of machining by laser beam application, ion application or the like.

In the first preferred embodiment, by performing an ion application process, a level difference between the positive pressure generator 21, the first middle stage 23, and the second middle stage 24 is set to 0.08 μm, and a level difference between the positive pressure generator 21 and the lower stage 22 including the negative pressure generator 221 is set to 1.0 μm. As an overall shape of the head slider 20, length in a direction of air flow, and a widthwise length and thickness at right angles to the direction of air flow are respectively 1.24 mm, 1.00 mm and 0.3 mm. Incidentally, these values are mentioned as an example, and the present invention is not limited to this example.

Figure 10A:
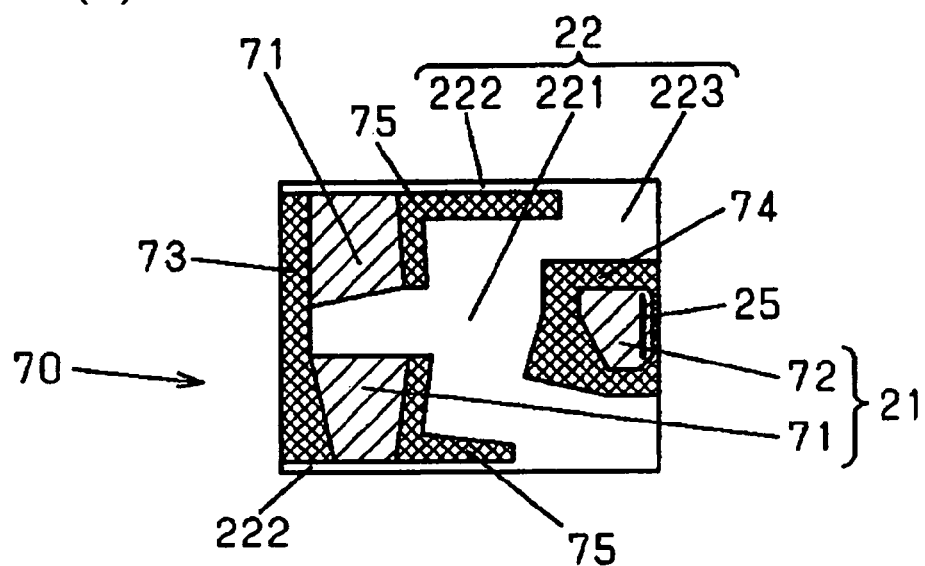
FIGS. 10(a) and 10(b) are plan views showing recording medium opposing surfaces of head sliders used for comparison with shape of the surface, opposing a recording medium, of the head slider in the first preferred embodiment of the present invention.
Figure 10B:
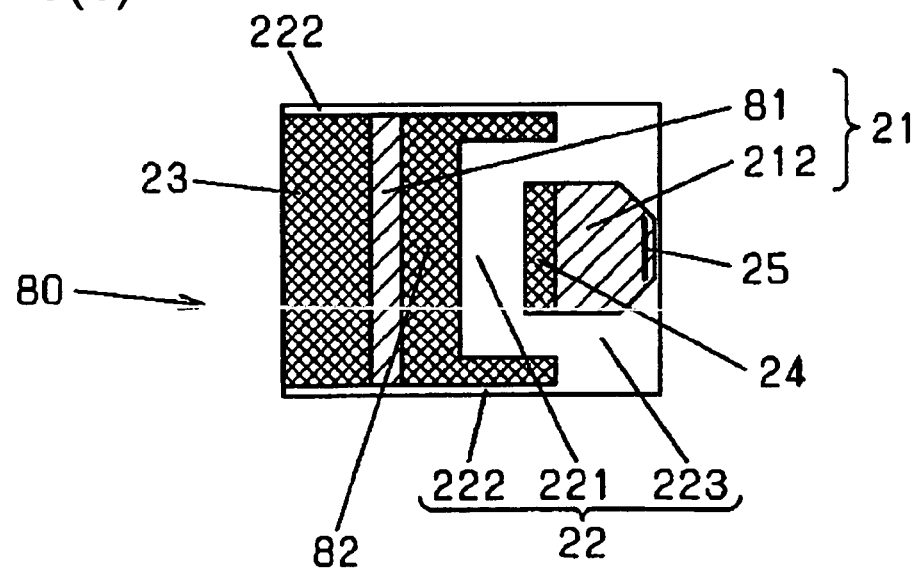

Further, for comparison with the head slider in the first preferred embodiment, head sliders shaped as shown in FIGS. 10(*a*) and 10(*b*) were also manufactured as trials. Elements with same functions and names as those shown in FIG. 5 are given same reference numerals, and description thereof is omitted. In FIG. 10(*a*), a head slider 70 is called comparative example 1, and a head slider 80 shown in FIG. 10(*b*) is called comparative example 2. Head slider 70, comparative example 1, comprises a first positive pressure generator 71 with a central portion separated at an air inflow side, a second positive pressure generator 72 formed so as to be surrounded by a second middle stage 74 at an air outflow side, and a negative pressure generator 221 disposed between the first positive pressure generator 71 and the second positive pressure generator 72. The first positive pressure generator 71 connects to a first middle stage 73 extending from an air inflow end, which also has side rails in a widthwise direction and is connected to a third middle stage 75 that is L-shaped. The second positive pressure generator 72 is surrounded by the second middle stage 74 disposed at the air outflow side, and an information conversion element 25 is formed at an air outflow end of the second positive pressure generator 72. The negative pressure generator 221 is surrounded by the first middle stage 73, the second middle stage 74, the third middle stage 75, and the first positive pressure generator 71. Side lower stage 222 is disposed at widthwise sides of the head slider 70, and air outflow side lower stage 223 is arranged at sides of the air outflow side in the same way as for the head slider 20 in the first preferred embodiment.

Also, the head slider 80, comparative example 2, comprises a stripe-like first positive pressure generator 81 formed so as to be held between a third middle stage 82 having a ⊐-shape and a first middle stage 23 which is flush with the third middle stage 82, and a negative pressure generator 221 is continuous with the third middle stage 82 and is formed to be smaller in area. Others are same in shape as the head slider 20 in the first preferred embodiment.

Regarding the head slider 20 in the first preferred embodiment, and the head sliders 70, 80 of comparative example 1 and comparative example 2, an immovable point is obtained from air layer rigidity, followed by obtaining a maximum shock generated due to coming into contact with a recording medium when a shock is applied in a direction toward the recording medium, for a purpose of evaluating shock resistance. In evaluation of shock resistance, an equivalent mass including the head slider and head slider holding section is 1 mg, a load from the support arm is 2 gf, a recording medium rotating speed is 4,500 rpm, and a skew angle at 6 mm radially of the recording medium is −5 degrees.

Figure 6:
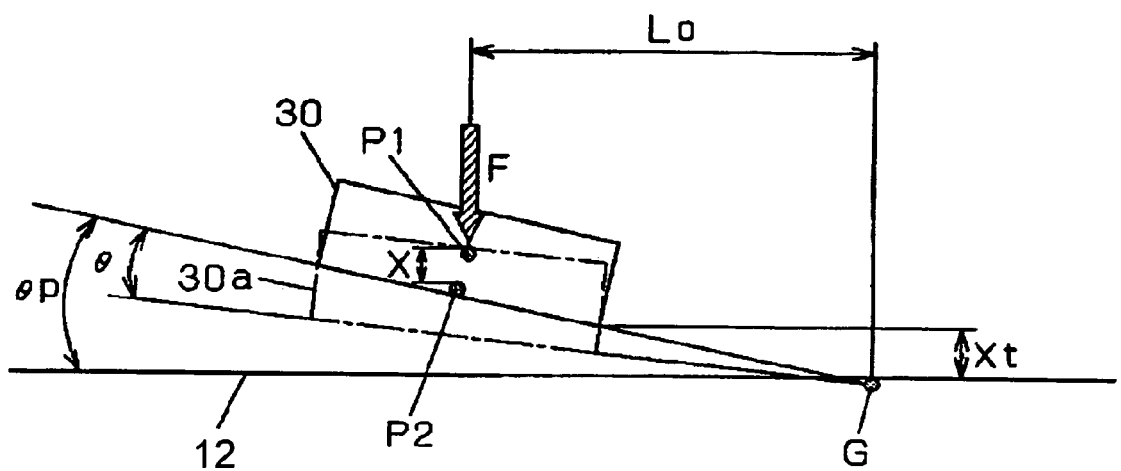
FIG. 6 is a schematic diagram for describing head slider displacement and an immovable point distance before and after application of shock to a head slider.

Further, the immovable point obtained from air layer rigidity is described by using FIG. 6. A state of head slider 30 being afloat over recording medium 12 by pitch angle θp and an amount of floatation Xt at an air outflow end is shown by solid lines, and a state of head slider 30a being displaced vertically a distance x and angularly displaced an angle θ due to impact force F applied to the head slider 30 is shown by chain lines. Immovable point G is shown by an intersection of extended lines of the head slider 30 in a steady state of being afloat and the head slider 30a after being displaced by impact force F, as shown in FIG. 6. Action point P1 of load is a center of head slider 30 in a direction of air flow, to which a load from a support arm (not shown) is also applied.

A center of the head slider 30 opposing recording medium 12 rotates about immovable point G from P1 in a steady state of being afloat to of P2 after displacement. Distance Lo from point P1 to the immovable point G can be obtained by formula (1) because θp is very small and can be considered to be cos θp=1.

$$L_o = \frac{x}{\theta} \qquad (1)$$

On the other hand, when displacement against impact force F from outside is rotation about point P1 and translation of point P1 toward the recording medium 12, distane $L_o$ can be represented by the following formula where displacement in a direction perpendicular to the recording medium 12 from point P1 of the load to the head slider 30 is x, and rotation is θ.

$$\begin{pmatrix} k_{11} & k_{12} \\ k_{21} & k_{22} \end{pmatrix} \begin{pmatrix} x \\ \theta \end{pmatrix} = \begin{pmatrix} F \\ O \end{pmatrix} \qquad (2)$$

In this formula, k11, k12, k21, and k22 are coefficients of rigidity of an air layer of the head slider 30, and k11 is vertical rigidity, k22 is rotational rigidity, and k12 and k21 are respectively a coefficient of force in a rotating direction generated when the head slider 30 moves in a direction perpendicular to the recording medium 12 and a coefficient of force in the perpendicular direction generated due to rotational movement. Formula (3) can be obtained by rearranging the formula as follows.

$$\begin{pmatrix} x \\ \theta \end{pmatrix} = \frac{1}{\Delta} \begin{pmatrix} k_{11} & -k_{12} \\ -k_{21} & k_{22} \end{pmatrix} \begin{pmatrix} F \\ 0 \end{pmatrix} = \frac{1}{\Delta} \begin{pmatrix} k_{22} & F \\ -k_{21} & F \end{pmatrix} \qquad (3)$$

Accordingly, distance Lo can be obtained from formula (1) and formula (3) as a ratio of rotational rigidity k22 of air layer to the coefficient of force k21 in the perpendicular direction generated due to rotational movement, as shown in formula (4).

$$L_o = \frac{x}{\theta} = -\frac{k_{22}}{k_{21}} \qquad (4)$$

The rigidity coefficients k22 and k21 can be precisely obtained once a shape of the surface of the head slider 30 opposing to recording medium 12, recording medium rotating speed, equivalent mass and the like are determined, and from a value then obtained, distance to $L_o$ can be prescribed.

Obtaining distance Lo from the ratio of the above rigidity coefficients, normalized Lo/Ls as against length Ls of head slider 30 and results of shock resistance are shown in Table 1. Length Ls of head slider 30 is a length parallel to the recording medium 12 surface, which differs from an actual length of head slider 30, but can be regarded as being substantially the same because θp is very small and can be considered to be cos θp=1.

|  | Lo/Ls | Shock resistive value: G |
|---|---|---|
| 1st embodiment | 0.9 | 8000 |
| Example 1 | 3.6 | 2080 |
| Example 2 | 0.45 | 4560 |

Figure 7A:
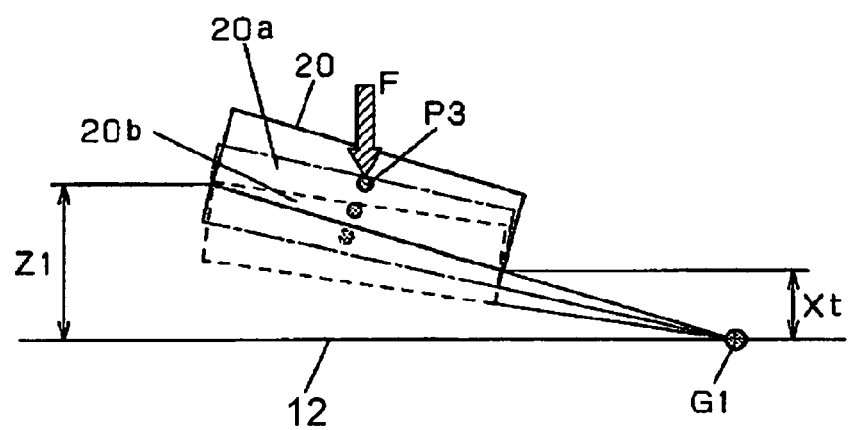
FIG. 7(a) is a schematic diagram for describing alteration of a floating status with shock applied to the head slider in the first preferred embodiment of the present invention.
Figure 7B:
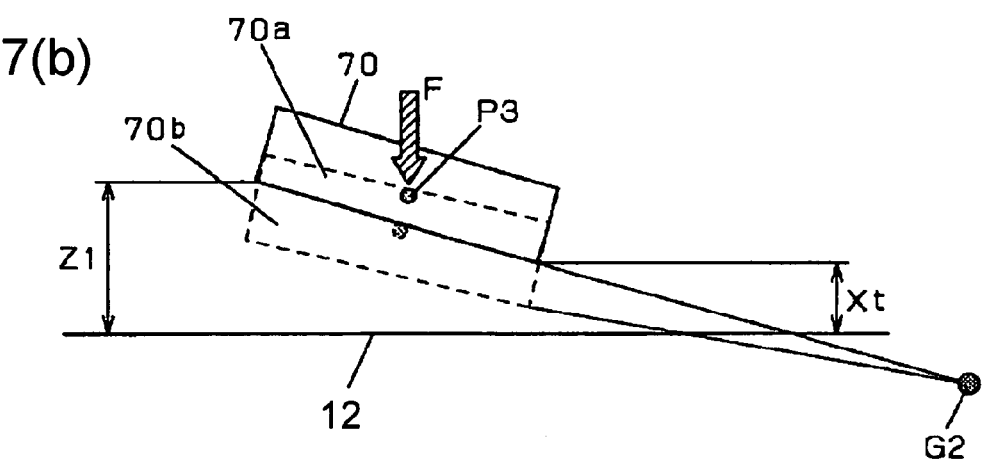
FIG. 7(b) is a schematic diagram for describing alteration of a floating status with shock applied to a head slider of comparative example 1.

As is obvious from Table 1, in the head slider 20 of the first preferred embodiment, the value of Lo/Ls is 0.9, and the value of shock resistance is about 8000 G. On the other hand, in the head slider 70 of Example 1, the value of Lo/Ls is 3.6, and the value of shock resistance is 2080 G in combination with a conventional support arm, while in the head slider 80 of Example 2, the value of Lo/Ls is 0.45, and the value of shock resistance is about 4560 G. Regarding these results, description will be given by using schematic diagrams shown in FIGS. 7(a)–7(c). The head slider 20 of the first preferred embodiment shown in FIG. 7(a) is floating with floating clearances of Z1 and Xt, respectively created at an air inflow end and an air outflow end, against a surface of recording medium 12. In this condition, when impact force F is applied to the head slider 20, the head slider is displaced to a position shown by head slider 20a, but an amount of displacement at the air outflow end is smaller as compared with an amount of displacement of floating clearance at the air inflow end. If a shock greater than impact force F is applied, the head slider will be displaced to a position shown by head slider 20b, but even in such condition, the head slider will still maintain a normal pitch angle, and therefore, an air layer will not be affected and may act as spring to prevent the head slider from bumping against the recording medium. Or even when such bumping is not completely prevented, damage will hardly take place because bumping energy is very little. A reason for this is that, in the head slider 20 of the first preferred embodiment, the surface of the head slider opposing recording medium 12 is formed so as to be positioned in a space where distance Lo is nearly equal to a length of the head slider 20.

The schematic diagram of the head slider 70 of Example 1 is shown in FIG. 7 (b). When impact force F is applied to the head slider 70 of Example 1, the head slider is displaced to a position shown by head slider 70a. Displacement takes place this way because immovable point G2 is positioned in a space that is 3.6 times as far away as compared with a length of the head slider 70. Namely, when the immovable point is positioned like this, impact force F causes almost no rotation in a direction of pitch, resulting in generation of nearly perpendicular movement, and therefore, a relatively low impact force causes an air outflow end to bump against recording medium 12.

Figure 7C:
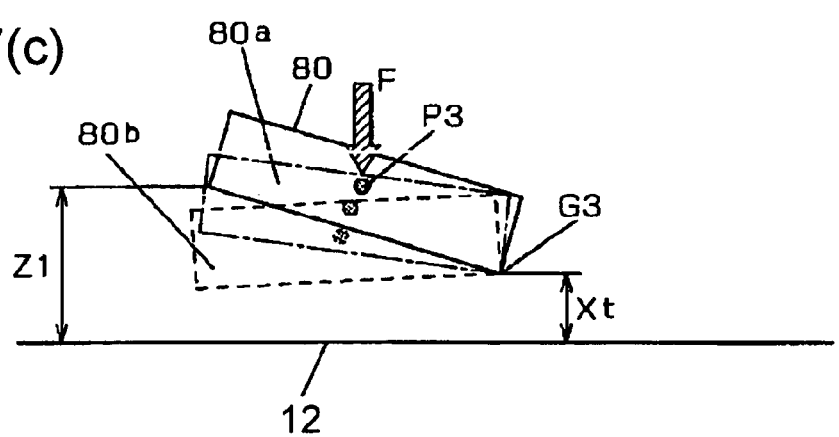
FIG. 7(c) is a schematic diagram for describing alteration of a floating status with shock applied to a head slider of comparative example 2.

The schematic diagram of the head slider of Example 2 is shown in FIG. 7(c). In the case of the head slider 80 of Example 2, a ratio of Lo/Ls is 0.45, and immovable point G3 is positioned a little closer to an action point than to an air outflow end. Accordingly, even if the head slider is displaced to a position shown by head slider 80a due to impact force F, the head slider will not bump against recording medium 12, which is therefore improved in terms of shock resistance as compared to the head slider 70 of Example 1. However, when a force is further applied, as shown by head slider 80b, a floating clearance at an air inflow side becomes less as compared with a floating clearance at an air outflow side, thereby forming no air layer. In this case, no buoyancy is created, and the head slider 80 bumps against a surface of the recording medium 12, thereby causing the head slider 80 or the recording medium 12 to be damaged. A value of shock resistance that causes a floating clearance at the air inflow side to become less as compared with the air outflow side varies with not only a shape of the surface of the head slider opposing a recording medium but also with variation of rotating speed and alteration of a skew angle, or with variation of load and the like. Also, lessening a floating clearance will rapidly lead to damage, thereby increasing a variation of shock resistance value.

Figure 8A:
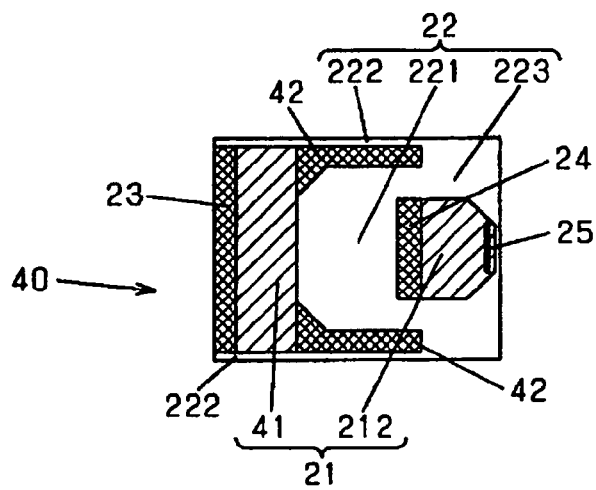
FIG. 8(a) is a plan view from a surface, opposing a recording medium, of a head slider having a different recording medium opposing surface than that of the first preferred embodiment of the present invention.
Figure 8B:
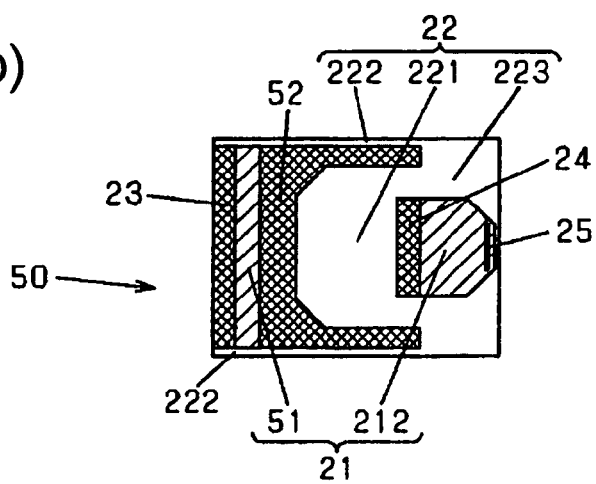
FIG. 8(b) is a plan view from a recording medium opposing surface of a head slider having another different surface, opposing a recording medium, than that of the first preferred embodiment of the present invention.
Figure 8C:
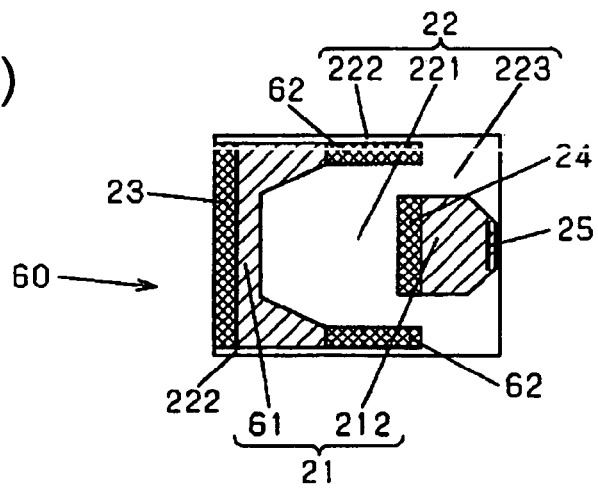
FIG. 8(c) is a plan view from a surface, opposing a recording medium of a head slider having a further different surface, opposing the recording medium, than that of the first preferred embodiment of the present invention.

Regarding a relationship between Lo/Ls value and a shock resistance value, these values have been obtained with respect to various head sliders having different shapes of the surface opposing recording medium 12. In FIGS. 8(a)–8(c), three types of shapes of a surface opposing recording medium 12 are shown. Names that correspond to elements and functions shown in FIG. 5 are given same reference numerals, and description thereof is omitted. A head slider 40 (hereafter referred to as type A) of FIG. 8(a) includes a first positive pressure generator 41 that is stripe-formed and held between a first middle stage 23 extended from an air inflow side and a third middle stage 42 having side rails at either widthwise side thereof. Differences from the head slider 20 in the first preferred embodiment shown in FIG. 5 are that the first positive pressure generator 41 is wide and stripe-formed at a position close to the air inflow side and that negative pressure generator 221 is mainly surrounded by the third middle stage 42. Therefore, in type A, positive pressure generated at the first positive pressure generator 41 is positioned a little closer to the air inflow side as compared with the head slider 20 shown in FIG. 5.

Also, a head slider 50 (hereafter referred to as type B) of FIG. 8(b) is such that a first positive pressure generator 51 is stripe-formed and held between a first middle stage 23 and a third middle stage 52 having a ⊐-shape, and a negative pressure generator 221 is formed in a region surrounded by the third middle stage 52, and others are same in shape as those of the head slider 20 shown in FIG. 5. Therefore, in type B, positive pressure generated at the first positive pressure generator 51 is positioned a little closer to the air inflow side as compared with the head slider 20 shown in FIG. 5, and also, rigidity of an air layer at this portion is a little lower.

Further, a head slider 60 (hereafter referred to as type C) of FIG. 8(c) is such that a first positive pressure generator 61 is shifted to an air inflow side to enlarge a region of a negative pressure generator 221, and side rails disposed at either side become a third middle stage 62 in a middle thereof, and others are same in shape as the head slider 20 shown in FIG. 5. Therefore, in type C, positive pressure generated at the first positive pressure generator 61 is positioned a little closer to the air inflow side as compared with the head slider 20 shown in FIG. 5, and negative pressure generated at the negative pressure generator 221 is also positioned a little closer to the air inflow side.

Lo/Ls values and shock resistance values of these three types of head sliders are shown in Table 2.

|  | Lo/Ls | Shock resistive value: G |
|---|---|---|
| Type A | 0.7 | 7200 |
| Type B | 1.6 | 6960 |
| Type C | 1.8 | 6400 |

As is obvious from this table, the Lo/Ls value is in a range from 0.7 to 1.8, and the shock resistance value ranges from 6400 G to 7200 G.

Figure 9:
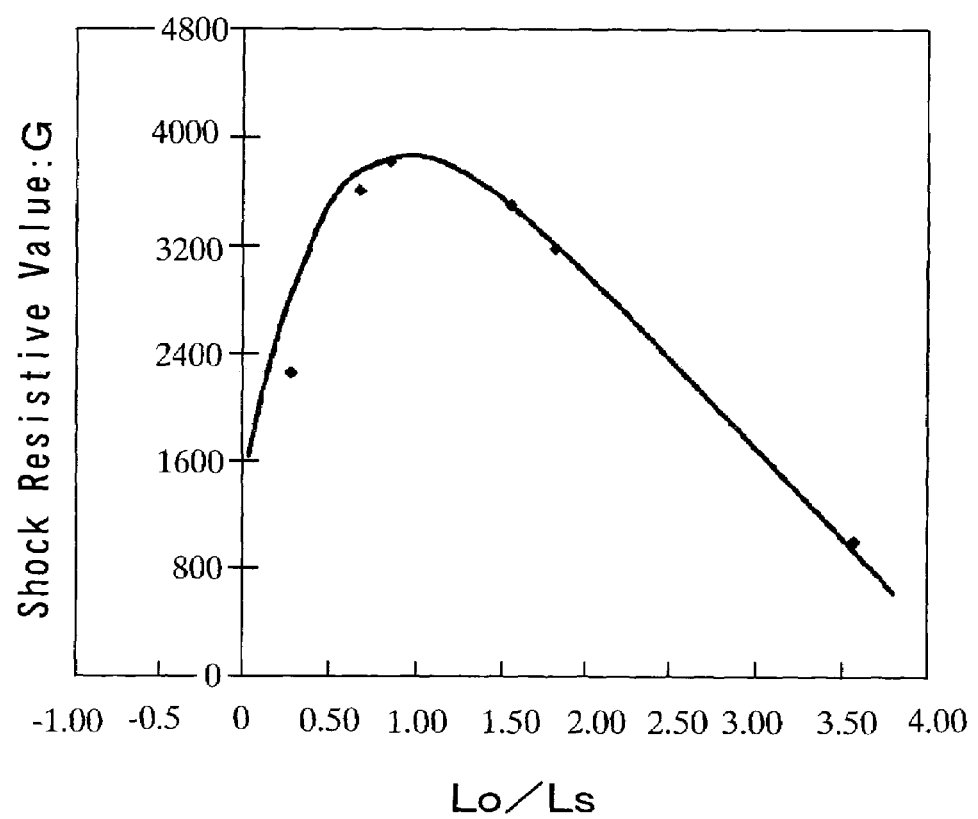
FIG. 9 is a diagram showing a relationship between Lo/Ls value and shock resistance value.

FIG. 9 is a result of obtaining a relationship between the Lo/Ls value and the shock resistance value with use of a head slider having a differently shaped surface opposing a recording medium. As is apparent from FIG. 9, when the Lo/Ls value is 0.5 or less, the shock resistance value abruptly lowers, and also, variation of the shock resistance value increases in this range. This is because, as described above, when the immovable point is positioned more inwardly than is an air outflow end of a head slider, a floating clearance becomes less at the air inflow end. Therefore, the Lo/Ls value is desirable to be larger than 0.5. On the other hand, when the Lo/Ls value is 1 or more, the shock resistance value is almost linearly reduced. As a shock resistance value required for mounting a disk drive in portable equipment, it is necessary to have this value be 750 G or more, and as an Lo/Ls value, it is desirable to have this value be 2 or less. Judging from these results, it is possible to realize a disk drive which can be mounted in portable equipment by using a head slider having a surface shape opposing a recording medium such that the Lo/Ls value is larger than 0.5 and less than 2.

Further, since negative pressure (a force by which a head slider is attracted to a recording medium) generated on an air lubricated surface of the head slider in the present preferred embodiment is about 2.5 gf, and a load from the support arm is 2 gf, the head slider does not jump from the recording medium even when the head slider is moved apart from the recording medium with a force of 3.5 gf. An equivalent mass of the support arm of the present preferred embodiment is 1 mg, and therefore, the head slider does not jump from the recording medium even when subjected to an impact acceleration of 3500 G, thereby preventing the recording medium from being seriously damaged by the head slider jumping and then bumping against the recording medium.

Also, in the above example of the shape of a head slider, length (Ls) in the direction of air flow is 1.24 mm. Judging from the above description and the results shown in Table 1, Table 2 and FIG. 9, Ls is desirable to be within the range of 0.2 mm<Ls<1.4 mm. Lower limit 0.2 mm is limited by a size of an information conversion element, and upper limit 1.4 mm is limited by a desirable mass of the head slider. Also, when a distance from a center of the head slider to its rotational center is Lk, established is the relationship of 0.5Ls<Lk<2Ls. And Lk is desirable to be within the range of 0.3 mm<Lk<2.0 mm. This range of Lk is limited by the lower limit value of Ls and the desirable mass of the head slider.

In the present preferred embodiment, described is the case of applying a load from the support arm, but the present invention is also preferable to be configured in that only mass of the head slider itself is applied as a load, and in this case, an action point of the load corresponds to a center of gravity of the head slider. Also, it is preferable that load from the support arm acts on a position other than the center of gravity of the head slider, and in this case, the action point of the load is preferable to be at a balancing position between the load from the support arm and the center of gravity of the head slider.

Also, in the present preferred embodiment, it is intended to obtain a position of the immovable point from two movements such as in a direction perpendicular to a recording medium and in a direction of pitch with respect to movement of the head slider, but it is also preferable to obtain the position including movement in a direction of roll as in the following formula.

$$\begin{pmatrix} x \\ \theta \\ \phi \end{pmatrix} = \begin{pmatrix} k_{11} & k_{12} & k_{13} \\ k_{21} & k_{22} & k_{23} \\ k_{31} & k_{32} & k_{33} \end{pmatrix} \begin{pmatrix} F \\ 0 \\ 0 \end{pmatrix}$$

Second Preferred Embodiment

A head support device in the second preferred embodiment of the present invention will be described in the following. Remarkable differences of the head support device in the second preferred embodiment of the present invention from that in the first preferred embodiment described above are that the head support device comprises a second base arm of high rigidity provided with a first bearing portion, and a second bearing portion using a pivot positioned apart from the first bearing portion, which also includes a head support arm comprising a support arm formed of a thin member such as SUS and a first base arm. The head support arm in the second preferred embodiment is mainly related with rotational operation in a direction perpendicular to a surface of a magnetic recording medium.

Figure 11:
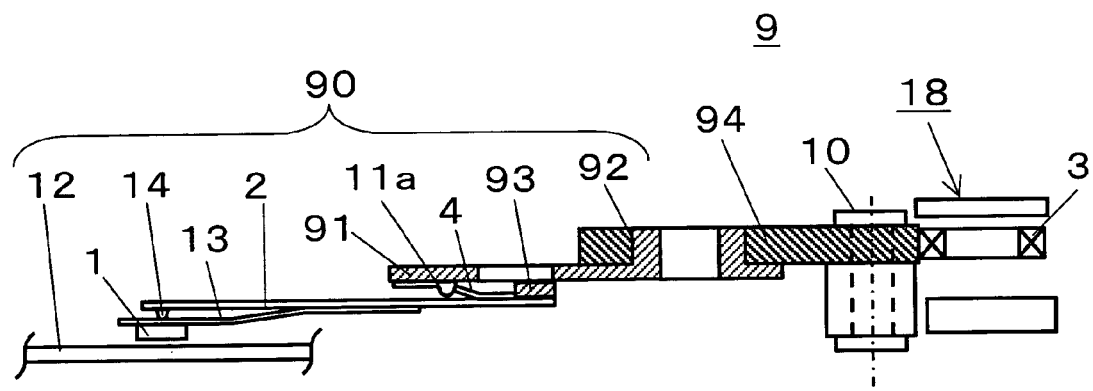
FIG. 11 is a side view of main parts showing a configuration of a head support arm and a head support device in a second preferred embodiment of the present invention.
Figure 12:
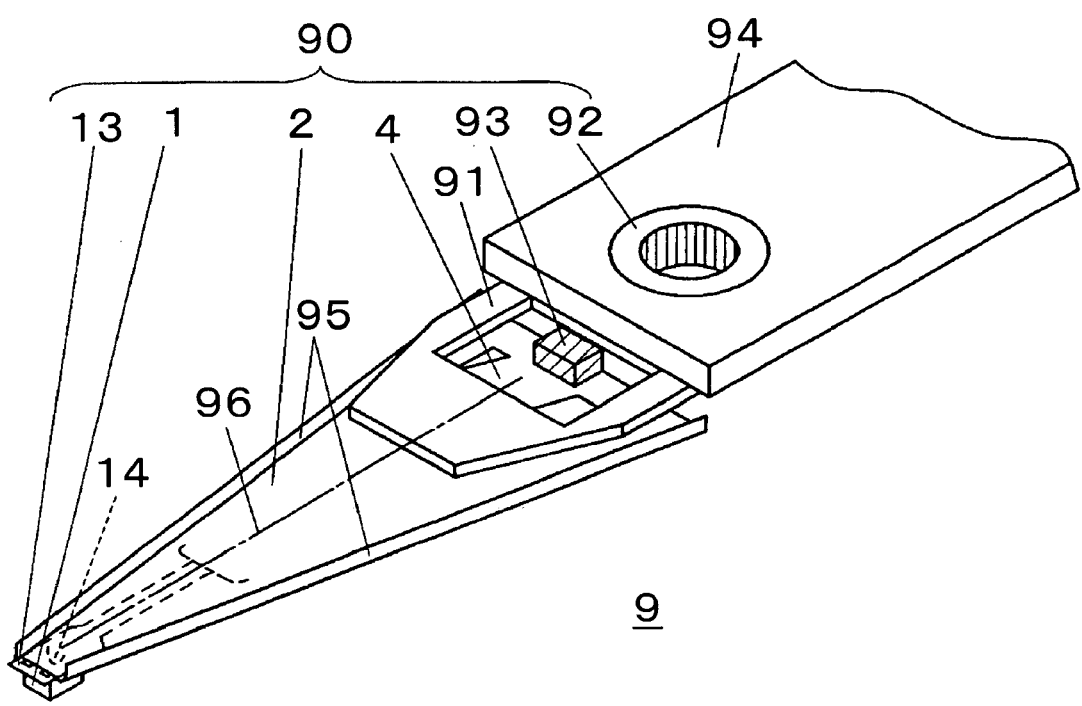
FIG. 12 is a perspective view of main parts showing the configuration of the head support arm and the head support device in the second preferred embodiment of the present invention.
Figure 13:
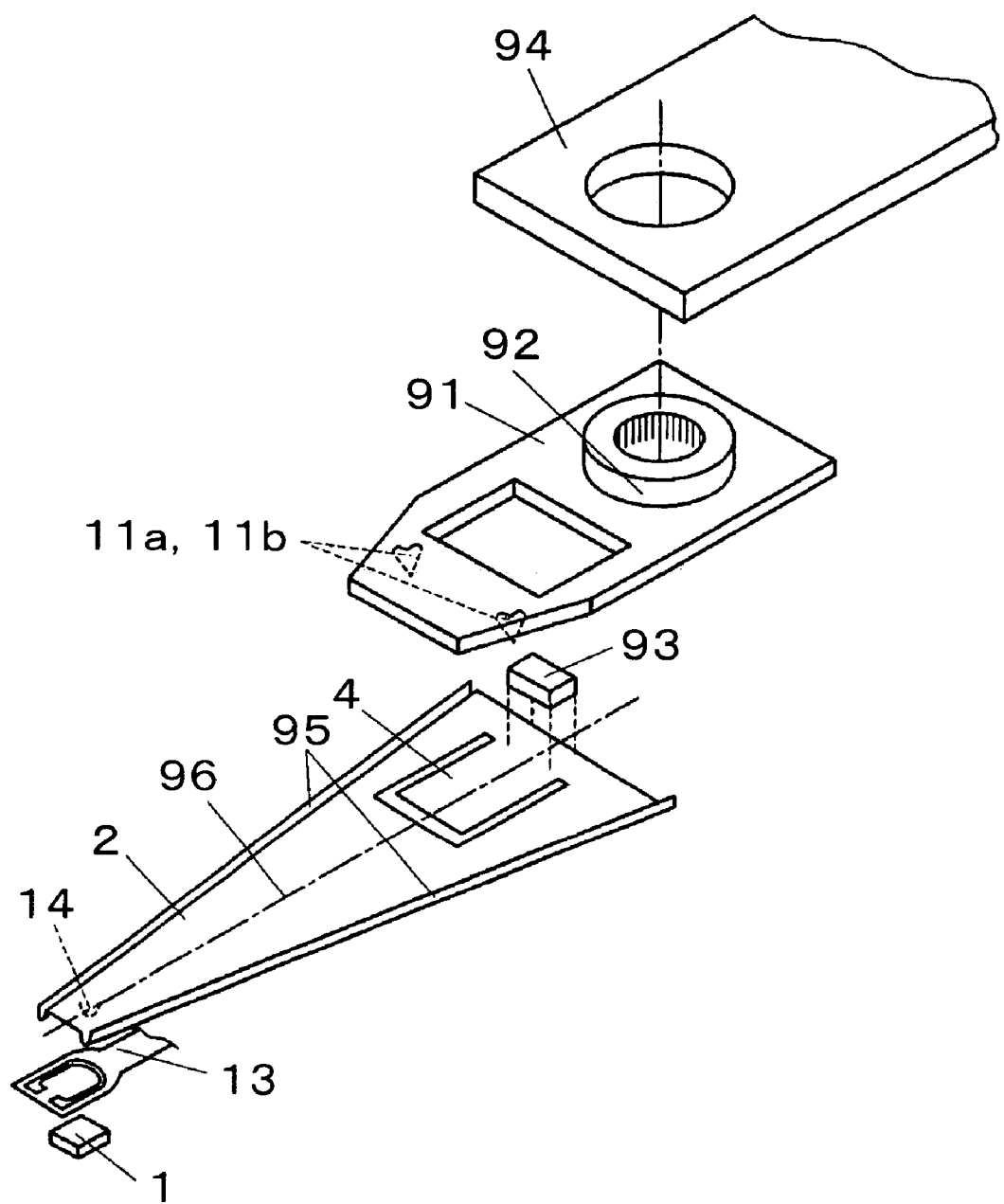
FIG. 13 is an exploded perspective view of main parts of the head support arm in the second preferred embodiment of the present invention.

The head support device in the second preferred embodiment of the present invention will be described in the following with reference to the drawings. FIG. 11, FIG. 12, and FIG. 13 are diagrams for describing the head support arm and the head support device in the second preferred embodiment of the present invention. FIG. 11 is a side view of main parts, showing a configuration of the head support arm and the head support device. FIG. 12 is a perspective view of the main parts, and FIG. 13 is an exploded perspective view of main parts of the head support arm. As an example of a disk drive, a magnetic recording and reproducing unit is described the same as in the first preferred embodiment.

In FIG. 11, FIG. 12, and FIG. 13, head slider 1 mounted with a magnetic head (not shown) is fixed on flexure 13, for example, integrally provided with a metal sheet such as SUS and a flexible wiring board, that is, a so-called ginbal mechanism. The flexure 13 is fixed on support arm 2, and a peak of dimple 14 disposed on the support arm 2 abuts the flexure 13 in such manner that the head slider 1 fixed on the flexure 13 is able to freely move about the peak of the dimple 14. The support arm 2 is provided with plate spring 4 that is an elastic member which is tongue-shaped by cutting away a part of an area close to a longitudinal center line 96, and one end of the tongue-shaped plate spring 4 is secured on first base arm 91 by a well-known method such as spot welding, supersonic welding, or laser beam welding. The plate spring 4 is preferable to be formed of another material member that is different from the support arm 2, and in the case of using another material member, one end of the material member to become the tongue-shaped plate spring 4 is fixed on the support arm 2, and another end is fixed on the first base arm 91 by an above well-known welding process or a like method. Also, the first base arm 91 is provided with two pivots 11a, 11b at positions symmetrical to the longitudinal center line 96 of the support arm 2, and respective peaks of these pivots 11a, 11b are abutting the support arm 2. Accordingly, it is configured that the support arm 2 fulcumed on the respective peaks of the two pivots 11a, 11b of the first base arm 91 is turned against an elastic force of the plate spring 4, and thereby, the head slider 1 is activated toward a recording medium in such manner that the head slider 1 fixed on the support arm 2 presses a surface of the recording medium (not shown in FIGS. 12, 13). Further, another end of the first base arm 91 is formed with coupling portion 92 made up of a hollow cylindrical projection or the like for integration with the second base arm 94. Also, a balancer is fixed on another end (opposite end of head slider 1 with pivot 11a therebetween) of the support arm 2 so that a center of gravity of the head slider 1, flexure 13 and support arm 2 in a direction of the recording medium passes through a line that connects the respective peaks of the two pivots 11a, 11b of the first base arm 91, on which the support arm 2 is fulcumed. The head support arm 90 comprises the head slider 1 mounted with a magnetic head, the flexure 13, the support arm 2 having plate spring 4, the first base arm 91, and the balancer 93. As the balancer 93, it is preferable to electrically construct this mechanism by using an amplifier circuit or the like.

Also, the plate spring 4 is formed by cutting away a part of the area close to the longitudinal center line 96 of the support arm 2, and both right and left sides of the support arm 2 are continuous in shape generally over an entire region in the longitudinal direction. Accordingly, side reinforcement 95 can be disposed by bending each of the right and left sides generally over the entire region. By providing the side reinforcement 95 for the support arm 2, rigidity of the support arm 2 can be greatly increased and resonance frequency of the support arm 2 can be greatly increased from about 2 kHz, conventional level, to about 10 kHz. Therefore, a rotating speed of the head support arm 90 can be very much increased and it becomes possible to greatly increase access speed.

The second base arm 94 has a hole portion for fastening the first base arm 91 at one end thereof, in which the first base arm 91 having the head slider 1 is fastened by a well-know method such as caulking. As a disk drive, there is provided a first bearing portion 10, and a driving device such as a voice coil motor 18 at an opposite side of the first base arm 91 with the first bearing portion 10 therebetween. Head support device 9 comprises the head support arm 90 and the second base arm 94, and therefore, a length of an arm portion of either the first base arm 91 or the second base arm 94 of the head support arm 90 can be changed in accordance with size of a recording medium, and it is possible to obtain a practical configuration to cope with standardization in manufacture of magnetic recording and reproducing units having recording mediums of various sizes and types.

A push force with which the head slider 1 pushes a surface of a recording medium can be freely set in accordance with material and thickness of the plate spring 4, height of each peak of the two pivots 11a, 11b, and a position of a connection or fixed portion of the support arm 2 and the plate spring 4. For example, a great activating force can be applied by thickly forming the plate spring 4 with a material of high rigidity. Or, a great activating force can also be applied by increasing the height of each peak of the two pivots 11a, 11b.

Next, the balancer 93 mentioned above is described by using FIG. 14. With reference to a rotational axis that connects the respective peaks of the two pivots 11a, 11b disposed on the first base arm 91, suppose a distance to a center of gravity of head slider 1 is $L_1$, a distance to a center of gravity of balancer 93 is $L_2$, mass of head slider 1 is $M_1$, mass of balancer 93 is $M_2$, total mass obtained by adding a mass of a rotating portion of support arm 2 to a mass of flexure 13 is $M_3$, and a distance to a center of gravity subjected to action of the total mass of the rotating portion of support arm 2 and flexure 13 is $L_3$, then it is preferable to set mass $M_2$ of balancer 93 so as to establish the following formula.

$$L_1 \times M_1 + L_3 \times M_3 = L_2 \times M_2 \tag{5}$$

Thus, setting respective centers of gravity of the head slider 1, flexure 13, the rotating portion of support arm 2, and balancer 93 in the head support arm 90, it is possible to prevent the head slider 1 from bumping against the recording medium 12 even in case an impact force is applied thereto. For example, suppose that an impact force is applied in a direction shown by Q in FIG. 14. Then, impact force $F_1$ proportional to mass $M_1$ will act on the head slider 1. Impact force $F_2$ proportional to mass $M_2$ will act on the balancer 93. Also, impact force $F_3$ proportional to total mass $M_3$ will act on the rotating portion of the support arm and the flexure 13.

The head support arm 90 is set so as to satisfy formula (5), and therefore, relations are established against these impact forces as follows:

$$L_1 \times F_1 + L_3 \times F_3 = L_2 \times F_2 \tag{6}$$

Consequently, even in case of being subjected to external impact forces, the head support arm 90 is free from rotating forces around the rotational axis that connects the respective peaks of the two pivots 11a, 11b of the first base arm 91. Accordingly, it is possible to prevent the head slider 1 from bumping against a surface of the recording medium 12 so as to prevent damage to the magnetic head (not shown) and the recording medium 12 mounted in the head slider 1. That is, the head support arm 90 of the head support device 9 which is free from excessive vibration and reliable against external shocks and the like can be realized by designing it so that a center of gravity of the head support arm 90 is substantially same as middle point P (not shown) on the line that connects the support arm 2 and the respective peaks of the two pivots 11a, 11b of the first base arm 91. A head support arm 90 greatest in shock resistance can be realized when a center of gravity of the head support arm 90 corresponds to middle point P, and it is also possible to realize a head support arm 90 having a practically sufficient shock resistance even in case of being offset from middle point P provided that the center of gravity is on the line connecting the respective peaks of the two pivots 11a, 11b of the first base arm 91.

Also, suppose a force that acts between the head support arm 90 and the respective peaks of two pivots 11a, 11b of the first base arm 91 is $F_4$, and $$F_1 + F_2 + F_3 \geq F_4 \tag{7}$$

then, the head support arm 90 is parted from the two pivots 11a, 11b of the first base arm 91. However, when $$F_1 + F_2 + F_3 \leq F_4 \tag{8}$$

then, the head support arm 90 is not parted from the two pivots 11a, 11b of the first base arm 91. Force $F_4$ that satisfies these conditions is produced by an internal stress generated from a rotational moment created by the plate spring 4 of the support arm 2, but it is possible to freely set the force as described above. Accordingly, it is easy to prevent the head support arm 90 from being parted from the two pivots 11a, 11b of the first base arm 91 even when subjected to impact forces.

Figure 14:
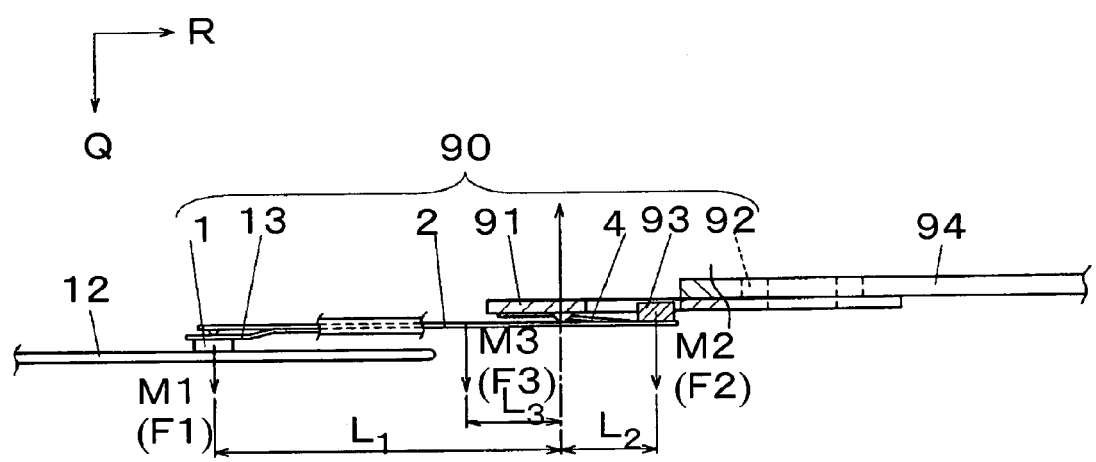
FIG. 14 is a side view for describing action of a balancer of the head support arm in the second preferred embodiment of the present invention.

Further, even against an impact force in a direction shown by R in FIG. 14, that is, in a direction parallel to the surface of the recording medium 12, if configured in that the center of gravity of the head support arm 90 corresponds to the rotational axis that connects the respective peaks of two pivots 11a, 11b of the first base arm 91, it is possible to prevent the head slider 1 from bumping against the recording medium 12 because no rotational moment is generated on the head support arm 90.

Also, in the head support device in the second preferred embodiment, almost the same configuration as that described in the first preferred embodiment can be used as configuration of the head slider. To avoid repeating this description, a detailed description of the head slider is omitted.

Figure 15:
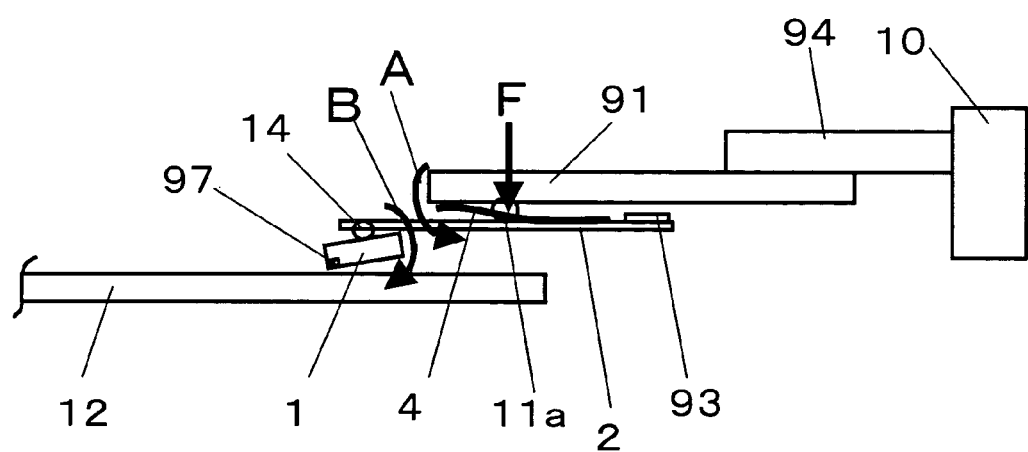
FIG. 15 is a diagram for describing operation of the head slider, with a shock load applied, in the second preferred embodiment of the present invention.

Only remarkable differences from the head slider of the head support device in the first preferred embodiment will be described here. In the head support device in the second preferred embodiment of the present invention, head 97 is mounted on the head slider 1 as shown in FIG. 15, which is positioned remote from the pivot 11a.

Suppose that external impact is applied to the head support device 9. Then, great impact load F is applied to the second bearing portion comprising the plate spring 4 and the pivot 11a for supporting the support arm 2, as shown by the downwardly directed arrow in FIG. 15. When an impact force greater than the above impact force is applied, a moment load as shown by arrow B is applied to the head slider 1 supported by the support arm 2 by virtue of flexure and dimple 14 as the support arm 2 rotates in the direction shown by arrow A. In the present preferred embodiment, the head 97 is mounted at a side of the support arm 2 that is apart from the pivot 11a, and an air inflow side of the head slider 1 is higher in an amount of floatation than an air outflow side where the head 97 is mounted. Accordingly, even when moment B is generated due to the impact load F at the air inflow side being higher in the amount of floatation, impact is absorbed by the portion being higher in the amount of floatation at the air inflow side, thereby preventing the head slider 1 from bumping against the recording medium 12. Further, since the head 97 is positioned at a side being free from bumping, the head slider 1 will not bump against the recording medium 12, thereby avoiding damage to the head 97.

Figure 16:
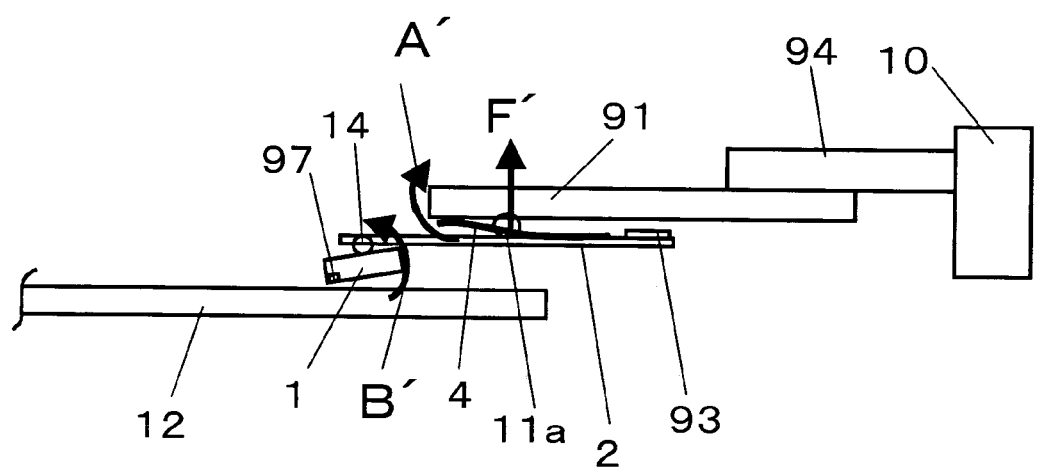
FIG. 16 is a diagram for describing operation of the head slider, with another shock load applied, in the second preferred embodiment of the present invention.
Figure 17:
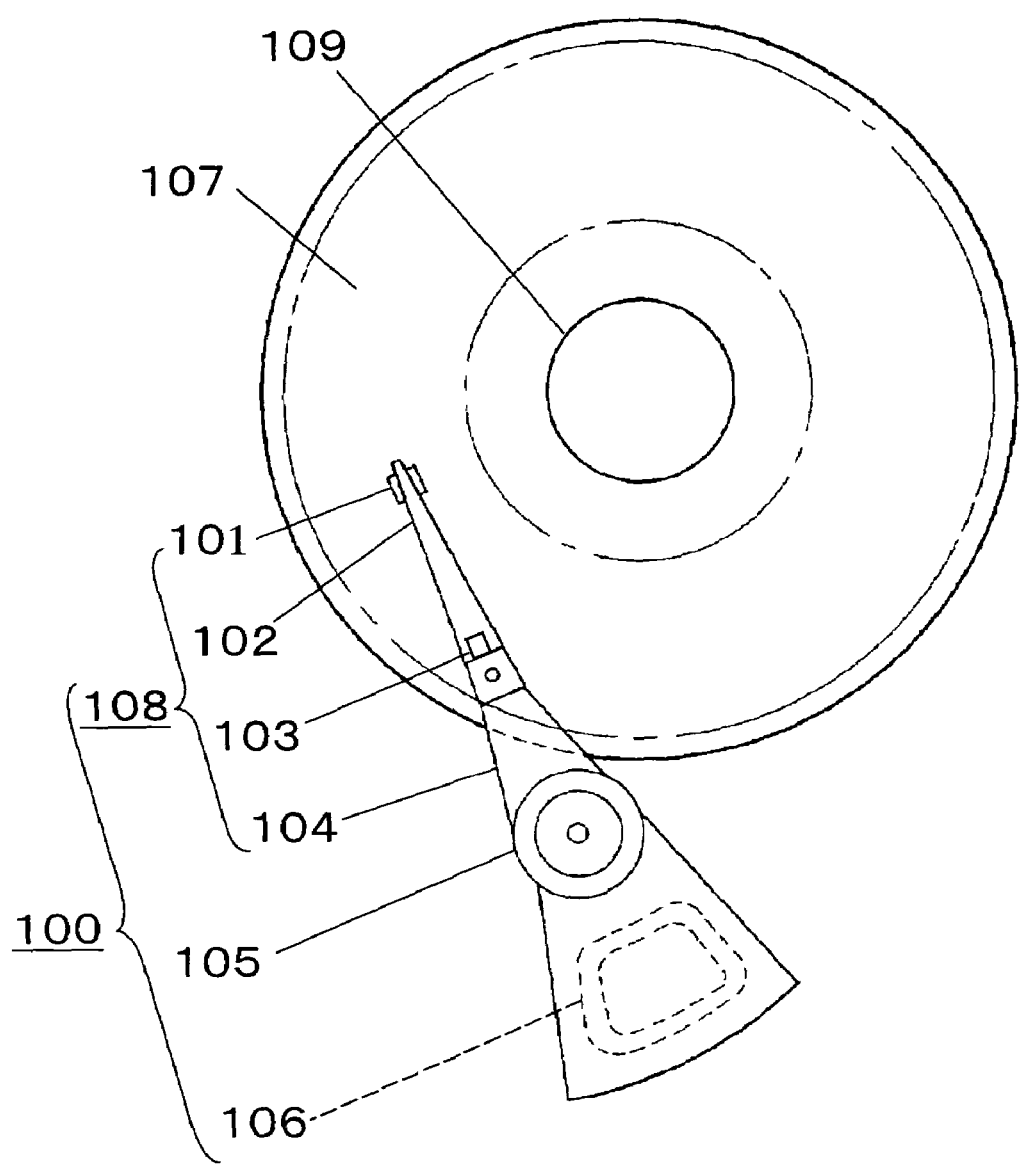
FIG. 17 is a plan view showing a configuration of a head support device of a conventional magnetic recording and reproducing unit, and a relationship between the head support device and a magnetic recording medium.
Figure 18:
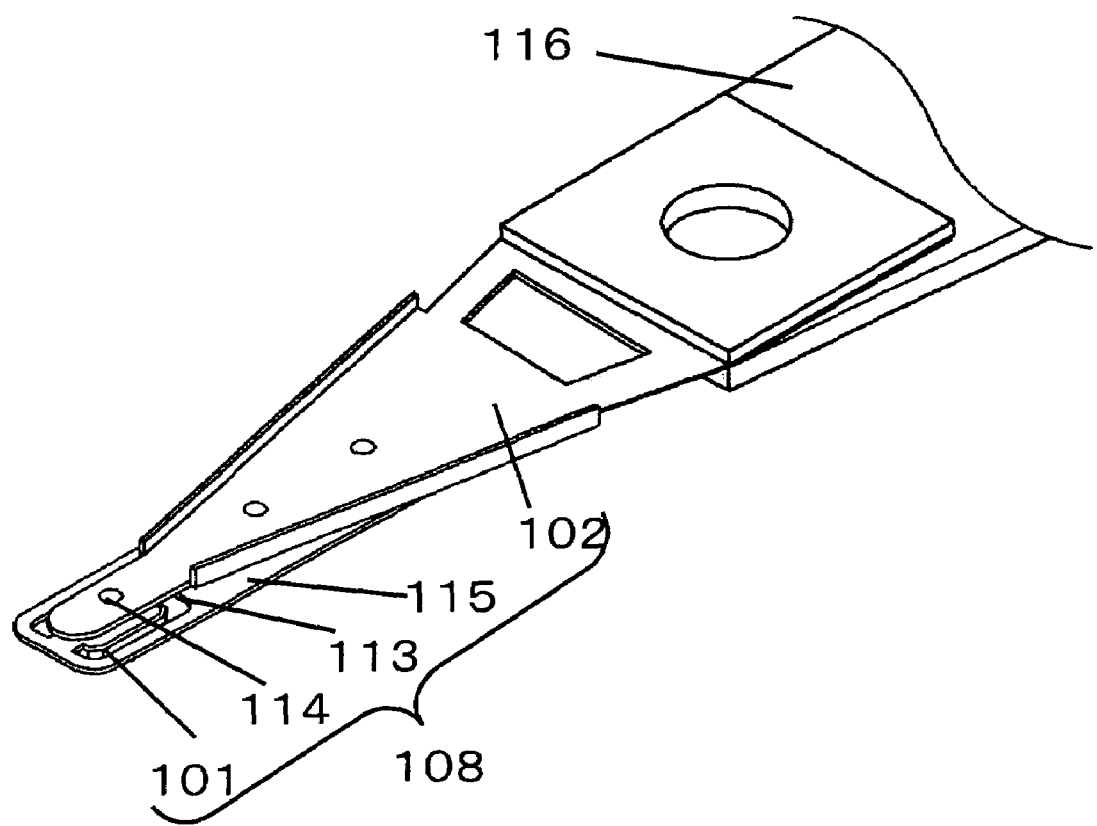
FIG. 18 is a perspective view of essential parts showing a head support arm with a conventional head slider mounted thereon.

Also, when an impact force is applied in a direction of moving the head slider 1 apart therefrom, as shown by the upwardly directed arrow in FIG. 16, great impact load F' is applied to the second bearing portion comprising the plate spring 4 and the pivot 11a for supporting the support arm 2. The support arm 2 rotates in the direction shown by arrow A', then a rotational moment acts on the head slider 1, causing a rotational force to be applied in the direction of arrow B' to move up the air inflow side of the head slider 1 and making it difficult for the head 97 mounted on the air outflow side to come into contact with the medium 12. If the head 97 is in the opposite position, the head slider 1 side is moved up but the air inflow side becomes unstable and an amount of inflow air is varied causing floatation of the slider to become unstable.

Since the head slider in the second preferred embodiment of the present invention has the same configuration as that of the first preferred embodiment, even when an impact force is applied to the head slider, it may prevent the head slider from bumping against a recording medium or decrease bumping energy. In addition, in the second preferred embodiment of the present invention, the head is disposed at an outermost side of the head slider that is most apart from the pivot that becomes the second bearing portion, and thereby, it is possible to realize a disk drive which is excellent in shock resistance.

Thus, according to the second preferred embodiment, even in case of being subjected to external shocks, no rotational force is generated around the rotational axis that connects respective peaks of two pivots of the first base arm. Accordingly, the head slider can be prevented from bumping against a surface of a recording medium and causing damage to the magnetic head and the recording medium mounted on the head slider, and it is possible to realize a head support arm of a head support device which is stable and free from excessive vibration.

Also, it becomes possible to increase rigidity of the entire structure, including the support arm, without losing flexibility thereof while increasing an activating force to the head slider. Further, since individual component elements can be separately and independently installed, it is easy to design the head support arm and to expand freedom of design.

Also, by disposing side reinforcements on either side of the support arm, or forming the plate spring as another member using a flexible material, and forming the support arm from a highly rigid material, it is possible to increase resonance frequency of the support arm, and there will arise no problem of vibration mode that has been a conventional problem. Accordingly, no settling operation is needed, and the support arm can be positioned by rotating it at a high speed and it becomes possible to improve access speed of the magnetic recording and reproducing unit.

Further, it is not necessary to carry out forming (bending) of a very accurate elastic member (plate spring) that has been needed in a conventional head support device, and it is possible to manufacture a head support arm and head support device by a simple process.

Also, according to size of a recording medium, length of an arm portion of either the first base arm or the second base arm can be changed and it is possible to obtain a practical configuration to cope with standardization in manufacture of magnetic recording and reproducing units having recording mediums of various sizes and types.

Further, generation of a vibration mode can be eliminated and settling time can be shortened by increasing resonance frequency of the support arm. Also, the support arm can be position by rotating it at a high speed and it is possible to realize a disk drive having improved access speed.

Also, in the head support arm in the second preferred embodiment, a pair of pivots as the bearing portion of the support arm are used, but the present invention is not limited to this. It is possible to use only one pivot. In this case, a configuration in which the support arm rotates only in a vertical direction can be realized by restricting movement by action of both the pivot and the plate spring.

Also, in the second preferred embodiment, the pair of pivots serving as the rotational axis of the support arm are positioned symmetrical to the longitudinal center line of the support arm, but the present invention is not limited to this configuration.

In the head support arm of the second preferred embodiment of the present invention, a ⊐-shaped through-hole cut away in a peripheral portion of a tongue-shaped plate spring (elastic member) is shown as an example in FIG. 13, but the present invention is not limited to this shape, and needless to say, it is also possible to cut away the portion into a U-shaped or V-shaped trapezoidal form.

In the preferred embodiments of the present invention, a head support device of a magnetic recording and reproducing unit using a magnetic head is described, but the head support device of the present invention will also bring about similar effects even when it is used as a head support device for a non-contact type disk recording and reproducing unit such as an optical disk drive and optical magnetic disk drive.

As described above, using the head support device of the present invention, it is possible to provide a head support device having high flexibility and shock resistance and capable of high-speed access while applying a sufficient load to the magnetic head, and in addition, with use of the head support device of the present invention, the support arm can be vertically moved, whereby it is possible to keep the magnetic head away from a recording medium when rotation of the recording medium is stopped.

Also, since the support arm, having a head slider mounted with a magnetic head at one end thereof, and the first base arm are secured via a plate spring that is an elastic member, and two pivots are disposed on either the support arm or the first base arm, and the support arm is rotated toward a surface of a recording medium by push forces of respective peaks of the two pivots, thereby pushing the head slider to the surface of the recording medium, there is no generation of rotational force around a line (rotational axis) that connects the respective peaks of two pivots disposed on either the first base arm or the support arm when subjected to an external impact force. Accordingly, it is possible to prevent the head slider from bumping against the surface of the recording medium and causing damage to the head, mounted to a head slider, and the recording medium, and to realize a head support arm of a head support device which is stable and free from excessive vibration. And, by using a head support device mounted with such a head support arm, it is possible to realize a disk drive which assures excellent reliability such as high shock resistance and high access speed.

Further, even when a great impact force is applied while the head slider is afloat over a recording medium, the head slider can be prevented from bumping against the recording medium, or bumping energy can be lessened, to prevent the head slider or the recording medium from being damaged. As a result, a highly reliable head support device and disk drive can be manufactured, and it is possible to mount a large-capacity, small-sized and thin disk drive in portable equipment.

What is claimed is:

1. An apparatus comprising:
   a head;
   a head support device including
      (i) a support arm, with said head at one end of said support arm,
      (ii) an elastic member near another end of said support arm, and
      (iii) a first base arm,
      with an end of said elastic member being fixed to said first base arm, and one of said support arm and said first base arm having a rotation supporting point;
   a head slider on which said head is mounted, with said head slider being disposed at said one end of said support arm via a flexure; and
   a balancer at said another end of said support arm such that said rotation supporting point is between said balancer and said head slider,
   wherein said head slider has a length Ls in a direction of air flow from an air inflow end of said head slider to an air outflow end of said head slider and exhibits an immovable point when said head slider is rotated in a direction of pitch, such that when an external impact force is applied to said head slider, with a distance from an action point of a load, that activates said head slider toward the recording medium, to the immovable point being Lo, 0.5<Lo/Ls<2.

2. The apparatus according to claim 1, wherein the immovable point is obtained from a ratio of rotational rigidity of an air layer, generated between a surface of said head slider and a recording medium when said head slider opposes the recording medium, to rotational rigidity with respect to vertical displacement of said head slider.

3. The apparatus according to claim 1, wherein a center of gravity of said head slider corresponds to an action point of a negative force, when generated to activate said head slider toward a recording medium.

4. The apparatus according to claim 1, wherein an equivalent mass of said head support device is less than a suction to be generated toward a recording medium on an air lubricated surface of said head slider.

5. The apparatus according to claim 1, wherein said elastic member is one-piece with said support arm and positioned along a longitudinal center line of said support arm.

6. The apparatus according to claim 1, wherein said elastic member is symmetrical with respect to a longitudinal center line of said support arm, and is defined by one of a U-shaped, V-shaped and ⊐-shaped through-hole in said support arm so as to be tongue-shaped.

7. An apparatus comprising:
   a head;
   a head support device including
      (i) a support arm, with said head at one end of said support arm,
      (ii) an elastic member near another end of said support arm, and
      (iii) a first base arm,
      with an end of said elastic member being fixed to said first base arm, and one of said support arm and said first base arm having a rotation supporting point;
   a head slider on which said head is mounted, with said head slider being disposed at said one end of said support arm via a flexure; and
   a balancer at said another end of said support arm such that said rotation supporting point is between said balancer and said head slider,
   wherein said head slider has a length Ls in a direction of air flow from an air inflow end of said head slider to an air outflow end of said head slider, exhibits an immovable point when said head slider is rotated in a direction of pitch, and exhibits a pitch angle θp when said head slider is afloat over a surface of a recording medium whereby a distance Xt is defined between the surface of the recording medium and the air outflow end of said head slider, such that when an external impact force is applied to said head slider, with a distance from an action point of a load, that activates said head slider toward the recording medium, to the immovable point being Lo, $1 \leq Lo/Ld \leq 2.5$, wherein $Ld=(Ls/2)+(Xt/\tan(\theta p))$.

8. The apparatus according to claim 7, wherein the immovable point is obtained from a ratio of rotational rigidity of an air layer, generated between a surface of said head slider and a recording medium when said head slider opposes the recording medium, to rotational rigidity with respect to vertical displacement of said head slider.

9. The apparatus according to claim 7, wherein an equivalent mass of said head support device is less than a suction to be generated toward a recording medium on an air lubricated surface of said head slider.

10. The apparatus according to claim 7, wherein said elastic member is one-piece with said support arm and positioned along a longitudinal center line of said support arm.

11. The apparatus according to claim 7, wherein said elastic member is symmetrical with respect to a longitudinal center line of said support arm, and is defined by one of a U-shaped, V-shaped and ⊐-shaped through-hole in said support arm so as to be tongue-shaped.

12. An apparatus comprising:
a head;
a head support device including
    (i) a support arm, with said head at one end of said support arm,
    (ii) an elastic member near another end of said support arm, and
    (iii) a first base arm,
    with an end of said elastic member being fixed to said first base arm, and one of said support arm and said first base arm having a rotation supporting point;
a head slider on which said head is mounted, with said head slider being disposed at said one end of said support arm via a flexure;
a balancer at said another end of said support arm such that said rotation supporting point is between said balancer and said head slider;
a positive pressure generating section on a surface of said head slider that is to oppose a recording medium, said positive pressure generating section including
    (i) a first positive pressure generator spaced a predetermined distance from an air inflow end of said head slider, said first positive pressure generator being perpendicular to a direction of air flow to be created, and
    (ii) a second positive pressure generator spaced a predetermined distance from an air outflow end of said head slider, said second positive pressure generator being at a widthwise center of said head slider and perpendicular to the direction of air flow to be created; and
a negative pressure generator between said first positive pressure generator and said second positive pressure generator, said negative pressure generator being formed so that a center of negative force, when generated to activate said head slider toward the recording medium, is positioned closer to said air outflow end of said head slider than to an action point of the negative force.

13. The apparatus according to claim 12, further comprising:
a side rail on each widthwise side of said surface of said head slider, each said side rail being connected to said first positive pressure generator.

14. The apparatus according to claim 13, wherein said negative pressure generator is adjacent an intermediate surface, with said intermediate surface being at a level that is between a level at which a surface of said negative pressure generator is located and a level at which a surface of said positive pressure generating section is located.

15. The apparatus according to claim 12, wherein said negative pressure generator is adjacent an intermediate surface, with said intermediate surface being level that is between a level at which a surface of said negative pressure generator is located and a level at which a surface of said positive pressure generating section is located.

16. The apparatus according to claim 12, wherein said elastic member is one-piece with said support arm and positioned along a longitudinal center line of said support arm.

17. The apparatus according to claim 12, wherein said elastic member is symmetrical with respect to a longitudinal center line of said support arm, and is defined by one of a U-shaped, V-shaped and ⊐-shaped through-hole in said support arm so as to be tongue-shaped.

18. An apparatus comprising:
a head; and
a head support device including
    (i) a support arm with said head at one end of said support arm,
    (ii) an elastic member near another end of said support arm, and
    (iii) a first base arm having a coupling portion at one end thereof,
    wherein an end of said elastic member is fixed to said first base arm, and one of said support arm and said first base arm has a rotation supporting point;
a second base arm having a hole at one end thereof for receiving said coupling portion so as to fasten said first base arm to said second base arm;
a bearing portion; and
a driving device at another end of said second base arm.

19. The apparatus according to claim 18, wherein said elastic member is one-piece with said support arm and positioned along a longitudinal center line of said support arm.

20. The apparatus according to claim 18, wherein said elastic member is symmetrical with respect to a longitudinal center line of said support arm, and is defined by one of a U-shaped, V-shaped and ⊐-shaped through-hole in said support arm so as to be tongue-shaped.

21. The apparatus according to claim 18, wherein said rotation supporting point includes two pivots.

22. The apparatus according to claim 21, further comprising:
a head slider connected to said support arm via a flexure; and
a balancer on said support arm,
wherein said head is mounted on said head slider such that an overall center of gravity, which is a composite of respective centers of gravity of said head slider, said flexure, said support arm, and said balancer, is positioned on a line that interconnects respective peaks of said two pivots.

23. The apparatus according to claim 21, wherein said two pivots are symmetrical with respect to a longitudinal center line of said support arm.

24. The apparatus according to claim 18, further comprising:
a side reinforcement at a longitudinal side of said support arm.

25. The apparatus according to claim 24, wherein said side reinforcement is formed by bending a portion of said support arm.

26. An apparatus comprising:
a head on a surface of a head slider that is to oppose a recording medium; and
a head support device including
  (i) a support arm, with said head at one end of said support arm,
  (ii) an elastic member near another end of said support arm, and
  (iii) a first base arm having a coupling portion at one end thereof,
  wherein an end of said elastic member is fixed to said first base arm, and one of said support arm and said first base arm has a rotation supporting point, and
  wherein said head is spaced from said rotation supporting point in a longitudinal direction of said support arm;
a second base arm having a hole at one end thereof for receiving said coupling portion so as to fasten said first base arm to said second base arm;
a bearing portion; and
a driving device at another end of said second base arm.

27. The apparatus according to claim 26, wherein said elastic member is one-piece with said support arm and positioned along a longitudinal center line of said support arm.

28. The apparatus according to claim 26, wherein said head slider is disposed at said one end of said support arm via a flexure.

29. The apparatus according to claim 26, wherein said elastic member is symmetrical relative to a longitudinal center line of said support arm, and is defined by one of a U-shaped, V-shaped and ⊐-shaped through-hole in said support arm so as to be tongue-shaped.

30. The apparatus according to claim 26, wherein said rotation supporting point includes two pivots.

31. The apparatus according to claim 26, further comprising:
a side reinforcement at a longitudinal side of said support arm.

* * * * *

UNITED STATES PATENT AND TRADEMARK OFFICE
CERTIFICATE OF CORRECTION

| | |
|---|---|
| PATENT NO. | : 7,095,593 B2 |
| APPLICATION NO. | : 10/670366 |
| DATED | : August 22, 2006 |
| INVENTOR(S) | : Yoshihiro Ueno et al. |

It is certified that error appears in the above-identified patent and that said Letters Patent is hereby corrected as shown below:

Claim 18

In column 28, line 24, replace "arm with" with --arm, with--.

Signed and Sealed this

Sixth Day of February, 2007

JON W. DUDAS
*Director of the United States Patent and Trademark Office*